United States Patent [19]
Strandjord et al.

[11] Patent Number: 5,465,149
[45] Date of Patent: Nov. 7, 1995

[54] LIGHTWAVE PHASE CONTROL FOR REDUCTION OF RESONATOR FIBER OPTIC GYROSCOPE KERR EFFECT ERROR

[75] Inventors: Lee J. Strandjord, Glendale; Glen A. Sanders, Scottsdale, both of Ariz.

[73] Assignee: Honeywell Inc., Minneapolis, Minn.

[21] Appl. No.: 209,510

[22] Filed: Mar. 10, 1994

[51] Int. Cl.⁶ .................................................. G01C 19/72
[52] U.S. Cl. ........................................................ 356/350
[58] Field of Search .................................... 356/350, 345; 385/12, 14; 250/227.19, 227.27

[56] References Cited

U.S. PATENT DOCUMENTS 5,349,441  9/1994  Sanders ............................. 356/350

Primary Examiner—Samuel A. Turner
Attorney, Agent, or Firm—John G. Shudy, Jr.

[57] ABSTRACT

An error reducer for reducing rotation rate errors arising because of an optical Kerr effect occurring in a coiled optical fiber in a rotation sensor. Through amplitude modulating electromagnetic waves propagating in that coil. A signal obtained from the coil based on the amplitude modulation component therein is used in a feedback loop to reduce or eliminate such errors.

30 Claims, 7 Drawing Sheets

LIGHTWAVE PHASE CONTROL FOR REDUCTION OF RESONATOR FIBER OPTIC GYROSCOPE KERR EFFECT ERROR

Reference is hereby made to an earlier filed co-pending application by G. Sanders entitled "Fiber Optic Gyroscope Refractive Index Induced Error Compensation" having Ser. No. 07/740,741. This co-pending application has been assigned to the same assignee as the present application.

BACKGROUND OF THE INVENTION

The present invention relates to fiber optic gyroscopes used for rotation sensing and, more particularly, to resonator fiber optic gyroscopes.

Fiber optic gyroscopes are an attractive means with which to sense rotation. They can be made quite small and still be constructed to withstand considerable mechanical shock, temperature change, and other environmental extremes. In the absence of moving parts, they can be nearly maintenance free, and they have the potential to become economical in cost. They can also be sensitive to low rotation rates that can be a problem in other kinds of optical gyroscopes.

There are various forms of optical inertial rotation sensors which use the well known Sagnac effect to detect rotation about a pertinent axis thereof. These include active optical gyroscopes having the gain medium contained in an optical cavity therein, such as the ring laser gyroscope, and passive optical gyroscopes without any gain medium in the primary optical path, such as the interferometric fiber optic gyroscope and the ring resonator fiber optic gyroscope. The avoidance of having the active medium along the primary optical path in the gyroscope eliminates some problems which are encountered in active gyroscopes such as low rotation rate lock-in, bias drift and some causes of scale factor variation.

Interferometric Fiber optic gyroscopes typically employ a single spatial mode optical fiber of a substantial length formed into a coil, this substantial length of optical fiber being relatively costly. Resonator fiber optic gyroscopes, on the other hand, are constructed with relatively few turns of a single spatial mode optical fiber giving them the potential of being more economical than interferometric fiber optic gyroscopes. A resonator fiber optic gyroscope typically has three to fifty meters of optical fiber in its coil versus 100 to 2,000 meters of optical fiber in coils used in interferometric fiber optic gyroscopes. In addition, resonator fiber optic gyroscopes appear to have certain advantages in scale factor linearity and dynamic range.

In either type of passive gyroscope, these coils are part of a substantially closed optical path in which an electromagnetic wave, or light wave, is introduced and split into a pair of such waves, to propagate in opposite directions through the optical fiber coil to both ultimately impinge on a photodetector or photodetectors, a single photodetector for both waves in interferometric fiber optic gyroscopes and on corresponding ones of a pair of photodetectors in resonator fiber optic gyroscopes. Rotation about the sensing axis of the core of the coiled optical fiber in either direction provides an effective optical path length increase in one rotational direction and an effective optical path length decrease in the opposite rotational direction for one member of this pair of electromagnetic waves. The opposite result occurs for the remaining member of the pair of electromagnetic waves for such rotation. Such path length differences between the pair of electromagnetic waves introduce corresponding phase shifts between those waves in interferometric fiber optic gyroscopes, or corresponding different optical cavity effective optical path lengths for these waves in a resonator fiber optic gyroscope.

In this latter instance, one or more optical frequency shifters are used to each effectively adjust the frequency of a corresponding one of the pair of electromagnetic waves that circulate in opposite directions in the resonator fiber optic coil. This is accomplished through such a frequency shifter shifting the frequency of a corresponding input electromagnetic wave giving rise to the resonator electromagnetic wave of interest. As a result, through feedback arrangements, the frequencies of each member of the pair of electromagnetic waves can be kept in resonance with the effective optical path length that wave is experiencing in the resonator fiber optic coil. Hence, any frequency difference between these waves becomes a measure of the rotation rate experienced by the resonator fiber optic coil about the axis around which this coil has been positioned. In such resonances, each wave has the portions thereof that previously were introduced in the resonator coil and have not yet dissipated, and the portions thereof currently being introduced in the resonator coil, at a frequency such that they are all in phase with one another so they additively combine to provide a peak in the intensity of that wave in that resonator over a local range of frequencies.

The difference in frequency between the members of the pair of opposing electromagnetic waves in a resonant fiber optic gyroscope is desired to be constant when rotation conditions about the resonator optic fiber coil axis are unchanging thereby requiring that stable resonance conditions occur in that resonator in those circumstances. Furthermore, there are several advantages in achieving frequency shifting of the resonator electromagnetic waves by operating one or more integrated optics phase modulators for this purpose through each of which the corresponding input electromagnetic wave transmitted. These advantages involve economics, packaging volume, and performance. Obtaining a constant frequency difference between these resonator wave pair members using such a phase modulator requires that the phase modulator change phase in the form of a linear ramp since the derivative of phase with respect to time yields the frequency.

Because of the impossibility of having a phase modulator provide an infinite duration linear ramp with respect to time, a repetitive linear ramp with periodic resetting of the phase to a reference value must be used. The resulting sawtooth phase change waveform results in what is termed serrodyne phase modulation of those electromagnetic waves passing through the modulator.

Consider the known resonator fiber optical gyroscope system of FIG. 1. An optical cavity resonator, 10, formed by a continual path optical fiber is provided with an input directional coupler, 11, and an output directional optical coupler, 12. Resonator 10 is formed of a single spatial mode optical fiber which has two polarization eigenstates. Avoiding different optical path lengths for electromagnetic waves in each state is solved by thoroughly mixing the polarized waves in each state or, alternatively, permitting only one polarization eigenstate to exist by use of a polarizer. In the first instance, such mixing is achieved by fabricating the resonator coil with two ends of a three to fifty meter length of such fiber spliced together so that the birefringence principal axes of the fiber are rotated 90° with respect to each other on opposite sides of that splice, 13. Alternatively, instead of a splice, block 13 can represent a polarizer. The resonator fiber is characterized by a loss coefficient, $\alpha$, and, if a splice is used, an average of the propagation constants for the principal birefringence axes, $\beta_o$, assuming an ideal 90° splice. If a polarizer is used, the propagation constant will be that of the optical path of the permitted eigenstate of the electromagnetic waves which includes the transmission axis of the polarizer assuming a sufficiently large extinction ratio characterizes its blocking axis.

Directional coupler 11 is fabricated by appropriately fusing together an input optical fiber, 14, with the optical fiber in resonator 10, the fibers being tapered as they come into the fused portion on either side of that portion. Directional coupler 11 provides a phase shift of $\pi/2$ between an input electromagnetic wave and the resulting electromagnetic wave at the resonator output thereof, the output wave further being characterized with respect to the input electromagnetic wave by a coupler coupling coefficient, $k_1$, and a coupler loss coefficient, $\gamma_1$. Directional coupler 11 has a suitable packaging arrangement thereabout.

Directional coupler 12 is constructed in generally the same manner as is directional coupler 11, but here an output optical fiber, 15, is fused to the optical fiber of resonator 10. Directional coupler 12 is characterized by a coupler coupling coefficient, $k_2$, and a coupler loss coefficient, $\gamma_2$.

The opposite ends of input optical fiber 14 are each connected to an integrated optics chip, 16, formed with lithium niobate ($LiNbO_3$) as the base material therefor. These ends of fiber 14 are appropriately coupled to integrated optical waveguides, 17 and 18, formed in the base material of integrated optics chip 16. The relationship of the ends of input optical fiber 14 and the ends of integrated waveguides 17 and 18 are such that electromagnetic waves can be efficiently passed therebetween without undue losses. Integrated waveguide 17 is provided between a pair of metal plates formed on the base material of integrated optics chip 16 to provide a phase modulator, 19, therein. Similarly, integrated waveguide 18 is formed between a another pair of metal plates formed on the base material to result in a further phase modulator, 20, in integrated optics chip 16. Integrated waveguides 17 and 18 merge with one another into a single integrated waveguide, 21, to thereby provide a "Y" coupler in integrated optics chip 16.

A laser, 22, is coupled to integrated waveguide 21 in a suitable manner so that light may be transmitted efficiently from laser 22 to integrated waveguide 21. Laser 22 is typically a solid state laser emitting electromagnetic radiation having a wavelength of 1.3 μm with a spectral line width of one to hundreds of Khz. The wavelength at which laser 22 operates, or the frequency thereof, $f_o$, can be adjusted by signals at an input thereof. Typical ways of providing such adjustment is to control the temperature of, or the current through, the solid state laser, or through the "pumping" semiconductor light emitting diode for the solid state laser, which in the latter instance may be a Nd:Yag laser. Where the diode is the emitting laser, the laser type may be an external cavity laser, a distributed feedback laser or other suitable types.

Thus, electromagnetic radiation emitted by laser 22 at a variable frequency $f_o$ is coupled to integrated waveguide 21, and from there split into two portions to form a pair of electromagnetic waves traveling in the input optical path in directions opposite one another. That is, the electromagnetic wave portion transmitted through integrated waveguide 17 proceeds therethrough and past phase modulator 19 into input optical fiber 14, and through input directional coupler 11 where a fraction $k_1$ is continually coupled into resonator 10 to repeatedly travel therearound in a first direction, the counterclockwise direction, there being a continual fractional loss for that wave of $\gamma_1$ in coupler 11 as indicated above. The remaining portion of that wave, neither entering resonator 10 nor lost in coupler 11, continues to travel along input optical fiber 14 into integrated optical waveguide 18, through phase modulator 20, and finally through integrated waveguide 21 returning toward laser 22. Usually, laser 22 contains an isolator to prevent such returning waves from reaching the lasing portion thereof so that its properties are unaffected by those returning waves.

Similarly, the electromagnetic wave portion from laser 22, entering integrated waveguide 21 to begin in integrated waveguide 18, passes through phase modulator 20 into input optical fiber 14 and input directional coupler 11 where a fraction $k_1$ thereof is continually coupled into resonator 10, accompanied by a continual fractional loss of $\gamma_1$, to repeatedly traverse resonator 10 in a direction opposite (clockwise) to that traversed by the first portion coupled into resonator 10 described above. The remaining portion not coupled into resonator 10, and not lost in directional coupler 11, continues through input optical fiber 14 into integrated waveguide 17, passing through phase modulator 19, to again travel in integrated waveguide 21 in the opposite direction on its return toward laser 22.

The pair of opposite direction traveling electromagnetic waves in resonator 10, a clockwise wave and a counterclockwise wave, each have a fraction $k_2$ continually coupled into output optical fiber 15 with a fraction $\gamma_2$ of each continually lost in coupler 12. The counterclockwise wave is transmitted by coupler 12 and fiber 15 to a corresponding photodetector, 23, and the clockwise wave is transmitted by them to a corresponding photodetector, 24, these photodetectors being positioned at opposite ends of output optical fiber 15. Photodetectors 23 and 24 are typically p-i-n photodiodes each of which is connected in corresponding one of a pair of bias and amplifying circuits, 25 and 26, respectively.

The frequency of the electromagnetic radiation emitted by laser 22, after being split from its combined form in integrated waveguide 21 into separate portions in integrated waveguides 17 and 18, has a resulting portion thereof shifted from frequency $f_o$ to a corresponding resonance frequency by a serrodyne waveform applied to phase modulator 19. The portion of the electromagnetic wave diverted into integrated waveguide 17 is shifted from frequency $f_o$ to frequency $f_o+f_1$ by phase modulator 19, and this frequency shifted electromagnetic wave is then coupled by input directional coupler 11 into resonator 10 as the counterclockwise electromagnetic wave. However, the portion of the electromagnetic wave directed into integrated waveguide 18 from integrated waveguide 21 is not shifted in frequency in the system of FIG. 1, although the frequency thereof could alternatively be similarly shifted from $f_o$ to $f_o+f_2$ by phase modulator 20 in forming the clockwise wave in coil 10. This arrangement would permit having to measure just differences in frequencies between the two serrodyne generators used in such an arrangement to obtain a system output signal rather than the absolute frequency value of a single generator which may be more convenient in some circumstances. The shifting of frequency of the wave in integrated waveguide 17 is caused by a serrodyne waveform applied to phase modulator 19 as indicated above, the serrodyne waveform for phase modulator 19 being supplied from a controlled serrodyne generator, 27. A similar serrodyne waveform would be applied to modulator 20 by a fixed frequency serrodyne generator if the wave in waveguide 18 was chosen to also be shifted in frequency.

Thus, controlled serrodyne generator 27 provides a sawtooth waveform output signal having a repetitive linear ramp variable frequency $f_1$, the frequency $f_1$ of this sawtooth waveform being controlled by an input shown on the upper side of generator 27 in FIG. 1. The repetitive linear ramp frequency of a sawtooth waveform from another serrodyne generator, if chosen as part of the control for modulator 20, would be fixed as indicated above, and held at a constant value, $f_2$.

Structural detail of controlled serrodyne generator 27 is shown within the dashed line box representing that generator in FIG. 1 as three further blocks. The frequency control input of generator 27 is the input of a voltage-to-frequency converter, 27'. The frequency of the output signal of converter 27', proportional to the voltage at its input, sets the rate of count accumulation in a counter, 27", to which the output of converter 27' is connected. The output count totals of counter 27" are provided to a digital-to-analog converter, 27''', to form a "staircase" waveform to approximate the linear "ramps" occurring in a true serrodyne waveform.

The clockwise electromagnetic wave in resonator 10 and the counterclockwise electromagnetic wave in resonator 10 must always have the frequencies thereof driven toward values causing these waves to be in resonance in resonator 10 for the effective optical path length each is experiencing. This includes the path length variation resulting from any rotation of resonator 10 about the symmetrical axis thereof that is substantially perpendicular to the plane of the loop forming that optical resonator. Since controlled serrodyne generator 27 has the frequency of its serrodyne waveform controlled externally, that frequency value can be adjusted to the point that the corresponding counterclockwise wave in resonator 10 is in resonance with its effective path length, at least in a steady state situation. There, of course, can be transient effects not reflecting resonance in situations of sufficiently rapid changes of rotation rates of resonator 10.

On the other hand, the absence of a sawtooth waveform from another serrodyne generator to form part of the control of modulator 20 as shown in FIG. 1, or the use of a constant frequency for the sawtooth waveform of another serrodyne generator alternatively chosen to form part of the control of modulator 20, requires that the clockwise electromagnetic wave in resonator 10 be adjusted by other means. The means chosen in FIG. 1 is adjusting the frequency value of the light in laser 22. Thus, the adjustment of the value of the frequency $f_1$ of the sawtooth waveform of controlled serrodyne generator 27 can be accomplished independently of the adjustment of the frequency $f_o$ of laser 22 so that, in steady state situations, both the counterclockwise electromagnetic wave and the clockwise electromagnetic wave in resonator 10 can be in resonance therein despite each experiencing a different effective optical path length therein.

Adjusting the frequency of the counter-clockwise and clockwise electromagnetic waves traveling in opposite directions in resonator 10 means adjusting the frequency of each of these waves so that they are operating at the center of one of the peaks in the corresponding intensity spectra for resonator 10 experienced by such waves. Maintaining the frequency of the counterclockwise and the clockwise waves at the center of a corresponding resonance peak in the corresponding one of the resonator intensity spectra would be a difficult matter if that peak had to be estimated directly without providing some additional indicator of just where the center of the resonance peak actually is. Thus, the system of FIG. 1 introduces a bias modulation with respect to each of the counterclockwise and clockwise waves in resonator 10 through phase modulators 19 and 20, respectively. Such a bias modulation of each of these waves is used in a corresponding feedback loop to provide a loop discriminant characteristic followed by a signal therein which is acted on by that loop to adjust frequency $f_o$ and $f_1$ as necessary to maintain resonance of the clockwise and counterclockwise waves, respectively.

A bias modulation generator, 28, provides a sinusoidal signal at a frequency $f_m$ to directly control modulator 20. Similarly, a further bias modulation generator, 29, provides a sinusoidal waveform of a frequency $f_n$ which is added to the sawtooth waveform at frequency $f_1$ provided by serrodyne generator 27. Frequencies $f_m$ and $f_n$ differ from one another to reduce the effects of electromagnetic wave backscattering in the optical fiber of resonator 10. The sinusoidal signal provided by bias modulation generator 28 is supplied to a node, 30. The addition of the sinusoidal signal provided by bias modulator generator 29 to the sawtooth waveform provided by serrodyne generator 27 is accomplished in a summer, 31.

The sinusoidal waveform provided at node 30 is amplified in a power amplifier, 32, which is used to provide sufficient voltage to operate phase modulator 20. Similarly, the combined output signal provided by summer 31 is provided to the input of a further power amplifier, 33, used to provide sufficient voltage to operate phase modulator 19.

In this arrangement, the input electromagnetic wave to resonator 10 from integrated waveguide 17 will have an instantaneous electric field frequency of:

$$f_o + f_1 - f_n \Delta\phi_n \sin\omega_n t$$

where $\Delta\phi_n$ is the amplitude of the bias modulation phase change at frequency $f_n$. The fraction of the electromagnetic wave reaching photodetector 23 through resonator 10 is not only shifted in frequency to a value of $f_o+f_1$, but is also effectively frequency modulated at $f_n$. Depending on the difference between the resonance frequency and $f_o+f_1$, the intensity at that photodetector will thus have variations occurring therein at integer multiples of $f_n$ (though the fundamental and odd harmonics thereof will not occur at exact resonance). These latter components have amplitude factors related to the deviation occurring in the sum of (a) the phase shift resulting from the propagation constant multiplied by the path length in the counterclockwise direction in resonator 10, plus (b) phase shifts due to rotation and other sources, from a value equaling an integer multiple of $2\pi$, a condition necessary for resonance along the effective optical path length in this direction.

The electromagnetic wave in integrated waveguide 18 enroute to resonator 10 will have instantaneous frequency equal to:

$$f_o - f_m \Delta\phi_m \sin\omega_m t$$

where $\Delta\phi_n$ is the amplitude of the bias modulation phase change at frequency The fraction thereof reaching photodetector 24 through resonator 10 is at a frequency value in this instance of $f_o$ and frequency modulated at $f_m$. Again, the intensity at photodetector 24 will have variations therein at integer multiples of $f_m$, though not at the fundamental and odd harmonics thereof if these clockwise waves are at exact resonance. These latter components also have amplitude factors related to the deviation of the sum of (a) the phase shift resulting from the propagation constant multiplied by the path length in the clockwise direction in resonator 10, plus (b) phase shifts due to rotation and other sources, from a value equaling an integer multiple of $2\pi$, again, a condition necessary for resonance along the effective optical path length in that direction.

Since the output signal of photodetector 24 has a frequency component at $f_m$ that is a measure of the deviation from resonance in resonator 10 in the clockwise direction, the output signal of bias and amplifier photodetector circuit 26 is provided to a filter, 34, capable of passing signal portions having a frequency component $f_m$. Similarly, the output signal of photodetector 23 has a frequency component at $f_n$ that is a measure of the deviation from resonance in the counterclockwise direction, and so a filter, 35, is provided at the output of photodetector bias and amplifier circuit 25 capable of passing signal components having a frequency of $f_n$.

The output signal from filter 34 is then provided to a phase detector, 36, at an operating signal input thereof. Phase detector 36 is a phase sensitive detector which also receives, at a demodulation signal input thereof, the output signal of bias modulation generator 28 which is the sinusoidal signal at frequency $f_m$. Similarly, the output signal from filter 35 is provided to an operating signal input of a further phase detector, 37, which also receives at a demodulation input thereof the output sinusoidal signal at frequency $f_n$ of bias modulation generator 29. The output signals of phase detectors 36 and 37 follow a loop discriminant characteristic so that they indicate how far from resonance are the corresponding frequencies in resonator 10.

The discriminant characteristic followed by the output of phase detectors 36 and 37 will change algebraic sign for the frequencies on either side of the resonance peak and will have a zero magnitude at the resonance peak or resonance center. In fact, for sufficiently small values of the bias modulation generator output signals, the characteristic followed by the output signals of phase detectors 36 and 37 will be close to the derivative with respect to frequency of the intensity spectrum near the corresponding resonance peak. Thus, the output characteristics followed by the output signals of phase detectors 36 and 37 provide signals well suited for a feedback loop used to adjust frequencies to keep the corresponding electromagnetic waves in resonance in resonator 10.

Errors in the feedback loop are to be eliminated, and so the output signal of phase detector 36 is supplied to an integrator, 38, and the output signal of phase detector 37 is supplied to a further integrator, 39. Deviations from resonance are stored in these integrators which are then used in the loop to force the waves back to resonance in resonator 10. The output signal of integrator 38, in turn, is supplied to an amplifier, 40, used to provide signals to laser 22 to control the frequency $f_o$ of light being emitted by laser 22, thereby closing the feedback loop for adjusting that frequency. Similarly, the output signal of integrator 39 is supplied to an amplifier, 41, which in turn has its outputs supplied to the modulation input of controlled serrodyne generator 27, thus completing the remaining feedback loop to be used for adjusting serrodyne frequency $f_1$.

However, certain errors can arise because of the effects of the propagation characteristics of resonator 10 on the electromagnetic waves oppositely propagating therein which lead to frequency differences therebetween that appear as though they were induced by rotations of resonator 10 about its axis of symmetry perpendicular to the plane in which it is positioned. One source of such error is the nonlinear behavior of the optical fiber material (primarily fused silica glass) in which these electromagnetic waves propagate resulting in differing indices of refraction being experienced by those waves in propagating through resonator 10.

The structure of the fused silica glass in the optical fiber used in resonator coil 10 has been found to give rise to a nonlinear polarization density that can be characterized as being of third order in the electric field. This means the material has a nonlinear dielectric tensor and so nonlinear indices of refraction which can differ for electromagnetic waves propagating in opposite directions through the coil. Thus, the propagation "constants" for the electromagnetic waves propagating in the clockwise and counterclockwise directions through coil 10 will exhibit an added nonlinear term depending on the intensities of the electric fields of the waves traveling therethrough, i.e. the optical Kerr effect. These added terms have been found to be expressible as:

$$\Delta\beta_{Kcw}(t,z) = \frac{2\omega_o n_{eff} n_2}{cA} [I_{cw}(t,z) + 2I_{ccw}(t,z)]$$

$$\Delta\beta_{Kccw}(t,z) = \frac{2(\omega_o + \omega_1) n_{eff} n_2}{cA} [I_{ccw}(t,z) + 2I_{cw}(t,z)]$$

where $\Delta\beta_{Kcw}(t,z)$ is the change in propagation "constant" for the clockwise electromagnetic wave in resonator coil 10 because of this effect, and $\Delta\beta_{Kccw}(t,z)$ is the change in the propagation "constant" for the counterclockwise traveling electromagnetic wave because of the effect as a function of the distance travelled through coil 10 represented by z. The intensity $I_{cw}(t,z)$ is the intensity at a time t and position z along coil 10 of the clockwise wave, and the intensity $I_{ccw}(t,z)$ is the similar intensity for the counterclockwise wave traveling along coil 10. The Kerr coefficient is $n_2$, and A represents the area of a cross section of the fiber in which the electromagnetic waves propagating therethrough are concentrated, with c being the speed of light in a vacuum.

As can be seen, the values of these last two expressions is different if $I_{cw} \neq I_{ccw}$ indicating that differences in these added propagation "constant" terms can occur only upon differences occurring in the intensities of the clockwise and counterclockwise waves propagating in coil 10. Such differences in intensity are difficult if not impossible to avoid in practice, and so different propagation constants will be experienced by each of the counter-propagating waves in that coil, a situation which has been found to lead to corresponding resonant frequency differences between these waves which do not differ in nature from the resonant frequency differences arising from rotations of this coil. Hence, such nonlinear material behavior leads to errors in the output of the system of FIG. 1.

The nature of such errors arising because of the occurrence of these nonlinear terms in the propagation "constants" for electromagnetic waves in coil 10 can be found using a suitable representation for these waves propagating in coil 10. One such representation that can be shown to be suitable for the clockwise wave is given as follows:

$$E_{cw}(t,z) = \sqrt{1-\gamma_1}\ i\sqrt{k_1}\ qE_{in} e^{i(\omega_o t + \Delta\phi_m \cos\omega_m t)} \times \left[ \sum_{u=0}^{\infty} \left( \sqrt{1-\gamma_1}\ \sqrt{1-k_1}\ \sqrt{1-\gamma_2}\ \sqrt{1-k_2}\ e^{-\frac{\alpha L}{2}} \right)^u \right] \times$$

-continued $$e^{-i(\beta_o-\Delta\beta_m \sin\omega_m t)Lu} e^{-i(\pm\phi_r+\theta+\theta_{Kcw})u} \Big] e^{-\frac{\alpha z}{2}} \text{ for } o \leq z \leq l_1$$

$$= \sqrt{1-\gamma_1} \; i\sqrt{k_1} \; qE_{in} e^{i(\omega_o t+\Delta\phi_m \cos\omega_m t)} \times$$

$$\left[ \sum_{u=0}^{\infty} \left( \sqrt{1-\gamma_1} \sqrt{1-k_1} \sqrt{1-\gamma_2} \sqrt{1-k_2} \; e^{-\frac{\alpha L}{2}} \right)^u \sqrt{1-\gamma_2} \sqrt{1-k_2} \times \right.$$

$$\left. e^{-i(\beta_o-\Delta\beta_m \sin\omega_m t)Lu} e^{-i(\pm\phi_r+\theta+\theta_{Kcw})u} \right] e^{-\frac{\alpha z}{2}} \text{ for } l_1 \leq z \leq L$$

where z has a value of zero at the output of coupler 11 for clockwise waves, a value of $l_1$ at the input to coupler 12 for clockwise waves, and a value of L at the input to coupler 11 for clockwise waves with the couplers assumed to have no significant extent along the z path. Thus, the distance from coupler 11 to coupler 12 not passing through splice (or polarizer) 13 is $l_1$, and the distance from coupler 12 to coupler 11 through splice (or polarizer) 13 is $l_2$ with $L=l_1+l_2$.

The effective propagation "constant" in the foregoing equation, $\beta_{cw}$, gives the effective phase change per unit length along coil 10, and comprises a pair of terms, that is $\beta_{cw}=\beta_o-\Delta\beta_m \sin\omega_m t$. The term $\beta=2\pi n_{eff} f_o/c$ is the weighted average of the propagation constants of the two principle axes of birefringence of the optical fiber in resonator 10 if a splice 13 has been used. This average is based on the fraction of travel over each axis by the electromagnetic waves in the resonator in the corresponding polarization state with changes between axes being due to the 90° rotation splice in the optical fiber of that resonator as described above. A rotation of other than 90° will give an uneven weighting to these axes. If, on the other hand, a polarizer is used rather than a splice at block 13, there will be only single propagation constant as $n_{eff}$ will no longer be an average of indices of refraction but a single value index of refraction (ignoring other index of refraction issues). Again, the parameter $\theta$ in the above equations for $E_{cw}$ reflects any added phase due to the 90° splice, or near 90° splice, involving block 13 if present rather than a polarizer.

The parameter $\Delta\beta_m=2\pi n_{eff} f_m \Delta\phi_m/c$ is the equivalent change in the effective propagation constant due to the incoming electromagnetic waves having been modulated sinusoidally at the rate $\omega_m$ with a peak amplitude change of $\Delta\phi_m$. The parameter $\pm\phi_r$ represents the Sagnac phase shift induced by rotation in one direction or another about the axis symmetry of resonator 10 perpendicular to a plane passing through all of that resonator. The coefficient $\alpha$ is the coefficient giving the loss per unit length in the resonator optical fiber of coil 10. The factor q represents the division of the electromagnetic wave from laser 22, $E_{in}$, due to the splitting of that wave by "Y" coupler 21 and also the losses for that wave accumulated on the way to input directional coupler 11. Of course, $\omega_o=2\pi f_o$, and is the frequency of oscillation in the electromagnetic wave provided by laser 22. The parameter u is the counting parameter of the number of circulations about coil 10 by the electromagnetic waves. Finally, the parameter $\theta_{Kcw}$ represents the phase change for one round trip through coil 10 in the electromagnetic waves in the clockwise direction due to the Kerr effect.

Although the last equation is indeed just for the clockwise traveling electromagnetic wave in resonator 10 that began in integrated optical waveguide 18, the counterpart equation for waves beginning in integrated waveguide 17 and traveling in the opposite or counterclockwise direction in resonator 10 will be quite similar and so is not separately set forth here. Such counterclockwise waves will, however, have the opposite sign for any rotation induced phase shift and will have a slightly different effective propagation "constant" $\beta_{ccw}$ because of the frequency shifts due to the use of serrodyne generator 27. Thus, $\beta_{ccw}=\beta_{0-1}-\Delta\beta_n \sin\omega_n t$. Then, $\beta_{0-1}=2\pi n_{eff}(f_o+f_1)/c$ and $\Delta\beta_n=2\pi n_{eff} f_n \Delta\phi_n/c$ where $\Delta\phi_n$ is the peak amplitude of the bias modulation sinusoid.

From the foregoing equation for $E_{cw}$, and from the counterpart equation for $E_{ccw}$ not set out here, the intensities associated with these propagating electromagnetic waves, $I_{cw}(t,z)$ and $I_{ccw}(t,z)$ can be found. Thus, $$I_{cw}(t,z) = E_{cw} \cdot E_{cw}^* = (1-\gamma_1)k_1 q^2 E^{2in} e^{-\alpha z} \times$$

$$\left| \frac{1}{1-\left(\sqrt{1-\gamma_1}\sqrt{1-k_1}\sqrt{1-\gamma_2}\sqrt{1-k_2}\; e^{-\frac{\alpha L}{2}}\right) e^{-i(\beta_o-\Delta\beta_m \sin\omega_m t)L} e^{-i(+\phi_r+\theta+\theta_{Kcw})}} \right|^2$$

$$= |t|^2 q^2 E_{in}^2 e^{-\alpha z} \frac{1}{(1-R)^2+4R\sin^2\left(\frac{\Delta_{cw}+\theta_{Kcw}}{2}\right)} \text{ for } o \leq z \leq l_1$$

where $$t \triangleq \sqrt{1-\gamma_1} \; i\sqrt{k_1} \; ; R \triangleq \sqrt{1-\gamma_1} \sqrt{1-\gamma_2} \sqrt{1-k_1} \sqrt{1-k_2} \; e^{-\frac{\alpha L}{2}}$$

and $$\Delta_{cw} \triangleq \beta_o L - \Delta\beta_m L \sin\omega_m t + \phi_r + \theta = \beta_{cw} L + \phi_r + \theta.$$

Similarly, $$I_{cw}(t,z) = |t|^2 (1-\gamma_2)(1-k_2) q^2 E_{in}^2 e^{-\alpha z} \times \frac{1}{(1-R)^2 + 4R\sin^2\left(\frac{\Delta_{cw} + \theta_{Kcw}}{2}\right)} \quad \text{for } l_1 < z \leq L$$

The well known limit for the infinite geometric series has been used in obtaining these equations for the clockwise intensity as has the well known Euler equation.

In a similar manner, the counterclockwise intensity is found $$I_{ccw}(t,z) = E_{ccw} \cdot E^*_{ccw} = |t|^2 p^2 E^{2in} e^{-\alpha(L-z)} \times \frac{1}{(1-R)^2 + 4R\sin^2\left(\frac{\Delta_{ccw} + \theta_{Kccw}}{2}\right)} \quad \text{for } l_1 < z \leq L$$

where p represents the split of $E_{in}$ going into waveguide 17 as well as the losses accumulated propagating to directional input coupler 11, and where $$\Delta_{ccw} \triangleq \beta_{0-1} L - \Delta\beta_n L \sin\omega_n t - \phi_r + \theta = \beta_{ccw} L - \phi_r + \theta$$

Here, $\theta_{Kccw}$ represents the phase change in resonator coil 10 for one passage of the counterclockwise electromagnetic wave therethrough due to the optical Kerr effect. Also, $$I_{ccw}(t,z) = |t|^2 (1-\gamma_2)(1-k_2) p^2 E^{2in} e^{-\alpha(L-z)} \times \frac{1}{(1-R)^2 + 4R\sin^2\left(\frac{\Delta_{ccw} + \theta_{Kccw}}{2}\right)} \quad \text{for } o \leq z \leq l_1$$

These equations can be further consolidated by appropriate substitutions based on the following definition which will be made further along in this text:

$$\Gamma(x) \triangleq \frac{1}{(1-R)^2 + 4R\sin^2\left(\frac{x}{2}\right)} = \frac{1}{1 + R^2 - 2R\cos x},$$

making use of a trigonometric identity.

These intensity equations can then be used to evaluate $\theta_{Kcw}$ since the clockwise Kerr effect phase error can be found by integrating the change in the propagation "constants" due to the Kerr effect over the optical path through resonator coil 10, or $$\theta_{Kcw} = \int_o^{l_1} \Delta\beta_{Kcw}(t,z) dz + \int_{l_1}^L \Delta\beta_{Kcw}(t,z) dz$$

From the equation above for $\Delta\beta_{Kcw}(t,z)$, this last expression can be rewritten as $$\theta_{Kcw} = \frac{2\omega_0 n_{eff} n_2}{cA} \int_o^{l_1} [I_{cw}(t,z) + 2I_{ccw}(t,z)] dz + \frac{2\omega_0 n_{eff} n_2}{cA} \int_{l_1}^L [I_{cw}(t,z) + 2I_{ccw}(t,z)] dz$$

The integrals involved in this last expression can be evaluated and shown to be $$\frac{2\omega_0 n_{eff} n_2}{cA} \int_o^L I_{cw}(t,z) dz =$$

$$\frac{2\omega_0 n_{eff} n_2}{cA} \left\{ \frac{1-[1-(1-\gamma_2)(1-k_2)]e^{-\alpha l_1} - (1-\gamma_2)(1-k_2)e^{-\alpha L}}{\alpha} \right\} \times$$

$$|t|^2 q^2 E^{2in} \Gamma(\Delta_{cw} + \theta_{Kcw})$$

$$\frac{2\omega_0 n_{eff} n_2}{cA} \int_o^L 2I_{ccw}(t,z) dz =$$

$$\frac{4\omega_0 n_{eff} n_2}{cA} \left\{ \frac{1-[1-(1-\gamma_2)(1-k_2)]e^{-\alpha(L-l_1)} - (1-\gamma_2)(1-k_2)e^{-\alpha L}}{\alpha} \right\} \times$$

$$|t|^2 q^2 E^{2in} \Gamma(\Delta_{ccw} + \theta_{Kccw})$$

These expressions for the integrals can be simplified by introducing $l_1 = L/2$, which is typically the situation occurring in the system of FIG. 1 although not a required condition for successful operation of the system. If that introduction is made, the terms in the brackets in the evaluations of the above integrals will be equal allowing the expression for the $\theta_{Kcw}$ to be written as:

$$\theta_{Kcw} = \delta I_o [q^2 \Gamma(\Delta_{cw} + \theta_{Kcw}) + 2p^2 \Gamma(\Delta_{ccw} + \theta_{Kccw})]$$

where $$I_o \triangleq E^{2in}$$

and

-continued $$\delta \triangleq \frac{2\omega_o n_{eff} n_2}{cA} |t|^2 \left\{ \frac{1 - [1 - (1-\gamma_2)(1-k_2)]e^{-\frac{\alpha L}{2}} - (1-\gamma_2)(1-k_2)e^{-\alpha L}}{\alpha} \right\}$$

In a similar manner, $\theta_{Kccw}$ can be found to be $$\theta_{Kccw} = \delta I_o [p^2 \Gamma(\Delta_{ccw} + \theta_{Kccw}) + 2q^2 \Gamma(\Delta_{cw} + \theta_{Kcw})]$$

As indicated above, the clockwise traveling electromagnetic wave portion reaching photodiode 24, $I_{cw-d}$, will have the frequency thereof controlled in the feedback loop operating laser 22 to set the value $f_o$ to keep that electromagnetic wave in resonance in resonator coil 10 in steady state conditions. This is accomplished in the feedback loop for laser 22 by forcing any bias modulation frequency component at the bias modulation frequency $\omega_m$ in $I_{cw-d}$ to zero through shifting the value of $f_o$ sufficiently for the clockwise wave to be in resonance. Such feedback action yields a clockwise wave intensity at photodiode 24 of $$I_{cw-d} = (1-\gamma_1)(1-\gamma_2)(1-k_1)(1-k_2)q^2 I_o e^{-\frac{\alpha L}{2}} \Gamma(\Delta_{cw} + \theta_{Kcw})$$

In such a resonance condition, the total phase change of the clockwise wave over the optical path through resonator optical fiber coil 10, $\Delta_{cw} + \bar{\theta}_{Kcw}$, must equal an integral number of cycles to be able to stably reproduce itself over that path. The parameter $\bar{\theta}_{Kcw}$ is the time average value of the Kerr effect phase change $\theta_{Kcw}$. This resonance condition can be expressed as $\beta_o L \pm \phi_r + \bar{\theta}_{Kcw} = 2m\pi$ assuming use of polarizer for block 13 (otherwise the splice angle $\theta$ must be included).

In a similar manner, the portion of the counterclockwise wave in resonator coil 10 impinges on photodiode 23, and the feedback loop beginning therefrom to control serrodyne generator 27 adjusts the frequency of the counterclockwise wave, $\omega_o + \omega_1$, to keep that wave in resonance in resonator optical fiber coil 10 in steady state conditions. Again, this is accomplished in this feedback loop through forcing to zero any bias modulation signal frequency component at bias modulation frequency $\omega_n$ in the counterclockwise wave intensity $I_{ccw-d}$ on photodiode 23 giving the result $$I_{ccw-d} = (1-\gamma_1)(1-\gamma_2)(1-k_1)(1-k_2)p^2 I_o e^{-\frac{\alpha L}{2}} \Gamma(\Delta_{ccw} + \theta_{Kccw})$$

In these circumstances at the resonance condition, again the phase change in the counterclockwise direction in the optical path in coil 10, $\Delta_{ccw} + \bar{\theta}_{Kccw}$, for the counterclockwise electromagnetic wave must be an integral number of cycles for stable reproduction of that wave over that path. This condition can be expressed as $\beta_{0-1} L \mp \phi_r + \bar{\theta}_{Kccw} = 2m\pi$, assuming use of a polarizer for block 13, where again m is an integer and $\bar{\theta}_{Kccw}$ is the time average value of the Kerr effect phase change over that optical path.

These two resonance conditions in the preceding paragraphs are, as indicated, maintained during steady state conditions in the system of FIG. 1. Thus, any changes in any of the terms in these resonance condition equations must balance one another if those conditions are to be maintained. As a result, the following conditions must also hold:

$$\bar{\Delta}_{cw} + \bar{\theta}_{Kcw} = o; \bar{\Delta}_{ccw} + \bar{\theta}Kccw = o$$

The bar over the top of the symbols used again denotes that the time average value is taken. The effects in $\phi_r$, $\bar{\theta}_{Kcw}$ and $\bar{\theta}_{Kccw}$ of the harmonics of the modulation frequencies in the signals at photodiodes 23 and 24 are so much smaller than both $2\pi$ and the amplitudes of the bias modulations $\Delta\phi_m$ and $\Delta\phi_n$ that they may be ignored.

Using these last two equations, and the expressions found above for $\theta_{Kcw}$ and $\theta_{Kccw}$, gives the result:

$$\bar{\Delta}_{cw} = -\delta I_o [q^2 \overline{\Gamma(\Delta\beta_m L \sin\omega_m t)} + 2p^2 \overline{\Gamma(\Delta\beta_n L \sin\omega_n t)}]$$

$$\bar{\Delta}_{ccw} = -\delta I_o [p^2 \overline{\Gamma(\Delta\beta_n L \sin\omega_n t)} + 2q^2 \overline{\Gamma(\Delta\beta_m L \sin\omega_m t)}]$$

Thus, under the bias modulations over the resonances at bias modulation frequencies $\omega_m$ and $\omega_n$, the time average change in phase in the clockwise direction from resonance set by the bias modulation feedback loops, $\bar{\Delta}_{cw}$, equals the time average change in phase over the optical path due to the presence of the optical Kerr effect. This time average phase change due to the Kerr effect occurs because the bias modulation signal amplitudes affect the time average intensity in the resonator differently in each propagation direction in resonator 10. This result, in turn, causes the feedback loops to maintain optical frequencies that are not due to the rotation rate of resonator 10 alone, but that are also due to the presence of the optical Kerr effect thus leading to error. This situation is also true of the time average change in phase from resonance in the counterclockwise direction, $\bar{\Delta}_{ccw}$, set by these loops. These last two expressions would otherwise be zero in the absence of the Kerr effect.

As is well known, the frequency difference between the clockwise and counterclockwise electromagnetic waves in resonator coil 10 for a rotation rate $\Omega$ is given by:

$$\Delta f = \frac{4A}{n_{eff} \lambda P} \Omega$$

where A is the area enclosed by resonator coil 10, P is the perimeter of that area, and $\lambda$ is the wavelength of the center of the spectrum of the electromagnetic waves emitted by source 11. Thus, the effective rotation rate error due to the Kerr effect, $\Omega_{Ke}$, can be written:

$$\Omega_{Ke} = \frac{n_{eff} \lambda P}{4A} \Delta f_{Ke}$$

where $\Delta f_{Ke}$ here is the resonant frequency difference between the clockwise and counterclockwise waves due to the optical Kerr effect. This frequency difference is equal to the total phase difference which occurs between the clockwise and counterclockwise waves around the perimeter of ring 10 because of the Kerr effect, $\bar{\Delta}_{cw} - \bar{\Delta}_{ccw}$, divided by $2\pi$ giving the number of amplitude wave cycles over this perimeter, divided by the time of propagation over this perimeter $n_{eff} P/c$, i.e. $\Delta f_{Ke} = (\bar{\Delta}_{cw} - \bar{\Delta}_{ccw}/2\pi) c/n_{eff} P$.

Thus, the expression above for the rotation rate error due to the Kerr effect $\Omega_{Ke}$ can be rewritten using the expression therefor given above, and this last expression along with the above expressions for $\overline{A}_{cw}$ and $\overline{A}_{ccw}$ to give the following result:

$$\Omega_{Ke} = \frac{\lambda c}{8\pi A} \delta I_o [q^2 \overline{\Gamma(\Delta\beta_m L \sin\omega_m t)} - p^2 \overline{\Gamma(\Delta\beta_n L \sin\omega_n t)}]$$

Therefore, the rotation rate error $\Omega_{Ke}$ can be evaluated by finding values for the two time averages occurring therein, or $$\overline{\Gamma(\Delta\beta_m L \sin\omega_m t)} = \frac{1}{T} \int_o^T \frac{1}{1 + R^2 - 2R\cos\Delta\beta_m L \sin\omega_m t} dt = \frac{1}{(1-R)\sqrt{(1-R)^2 + R(\Delta\beta_m L)^2}}$$

$$\overline{\Gamma(\Delta\beta_n L \sin\omega_n t)} = \frac{1}{T} \int_o^T \frac{1}{1 + R^2 - 2R\cos\Delta\beta_n L \sin\omega_n t} dt = \frac{1}{(1-R)\sqrt{(1-R)^2 + R(\Delta\beta_n L)^2}}$$

The integrals in these last expressions have been evaluated using a small angle approximation based on the amplitude of the phase changes due to the bias modulations being relatively small. If it is also assumed, as is typical, that the difference between the phase change amplitudes of the bias modulations are small, or $$\Delta\beta_m \propto \Delta\beta_n$$

and the following definition is made $$\Delta\beta \triangleq \frac{\Delta\beta_m + \Delta\beta_n}{2},$$

then $$\frac{\Delta\beta_m - \Delta\beta_n}{2} \ll \Delta\beta$$

In these circumstances, the rotational error rate due to the optical Kerr effect becomes:

$$\Omega_{Kc} = \frac{\lambda c}{8\pi A} \frac{\delta I_o}{(1-R)\sqrt{(1-R)^2 + R(\Delta\beta L)^2}} \left\{ (q^2 - p^2) - \frac{R\Delta\beta L^2(p^2+q^2)}{(1-R)^2 + R(\Delta\beta L)^2} \left( \frac{\Delta\beta_m - \Delta\beta_n}{2} \right) \right\}$$

This result for the rotational rate error due to the Kerr effect can be written in simplified form by the introduction of two constants, $c_1$ and $c_2$, defined as follows:

$$c_1 \triangleq \frac{\lambda c \delta}{8\pi A(1-R)\sqrt{(1-R)^2 + R(\Delta\beta L)^2}}$$

and $$c_2 \triangleq \frac{R\Delta\beta L}{2[(1-R)^2 + R(\Delta\beta L)^2]}.$$

Then the expression above for the rotational rate error due to the Kerr effect can be written as:

$$\Omega_{Ke} = c_1 I_o \{(q^2 - p^2) - c_2(\Delta\beta_m - \Delta\beta_n)L(p^2 + q^2)\}$$

Thus, the rotational rate error due to the Kerr effect can be seen to depend linearly on the input intensity of the electromagnetic waves provided by laser 22. In addition, the error can be seen to arise because of unequal counter-rotating electromagnetic waves due to unequal fractions p and q of the input waves being converted to such counter-rotating waves at integrated waveguide junction 21 providing a "Y" coupler in integrated optics chip 16, compounded by any inequalities in the bias modulation amplitudes and frequencies resulting in unequal corresponding modulation propagation "constants" $\Delta\beta_m$ and $\Delta\beta_n$. In practice, such inequalities are often, if not usually, unavoidable so that resultant Kerr effect errors are present.

To achieve suitable accuracy in a resonator fiber optic gyroscope in many applications, such errors must be substantially reduced or eliminated. One manner of correcting errors of this nature has been set out in the U.S. Pat. No. 4,673,293 to Sanders. There, feedback has been used to alter the intensity of one of the propagating electromagnetic waves to force an error signal based on errors of the foregoing nature towards the value of zero. However, this arrangement requires use of an intensity modulator in the path of one of the counter-propagating electromagnetic waves to effect control thereof. A modulator of that type of sufficient capability is typically expensive because of the difficulties in fabricating one suitable for the intended use. Therefore, there is a desire to provide a fiber optic gyroscope which overcomes the present errors due to the Kerr effect in an alternative manner.

Another method for correcting errors of the foregoing nature has been set out in the related patent application referred to above having Ser. No. 07/740,741. Described therein is a compensation arrangement for compensating gyroscope output signals in such a manner as to leave them free or nearly free of such errors. Nevertheless, there are situations where it is desirable to have the gyroscope system output signal presented with such errors reduced therein or eliminated therefrom to avoid the need for compensation arrangements. Thus, there remains a desire to provide a fiber optic gyroscope which overcomes the errors set out above due to the Kerr effect in an alternative manner.

SUMMARY OF THE INVENTION

The present invention provides an error reducer for reducing rotation rate errors arising because of an optical Kerr effect occurring in a coiled optical fiber in a rotation sensor capable of sensing rotation about an axis of the coiled fiber, formed in a closed optical path, and having a coupler connected thereto to permit electromagnetic waves to be coupled between this coiled optical fiber and an external optical fiber. Rotation is sensed based on having a pair of electromagnetic waves traveling through the coiled optical fiber in opposing directions to each impinge on a corresponding one of a pair of photodetectors. At least one of these opposing waves is subject to having its phase varied by selected signals supplied to an input of a phase modulator, and with the photodetector receiving that wave providing an output signal in response thereto that is representative of that wave. An amplitude modulation signal generator operates to provide an amplitude modulation component in the opposing electromagnetic waves in the coiled optical fiber. A balance control signal generator has an amplitude control input, and has an output electrically connected to the phase modulator so as to be capable of providing a phase modulation component in an opposing coiled optical fiber electromagnetic wave at a selected balance control frequency. This signal generator can adjust values of the amplitude of the phase modulation component it provides as directed by signals provided at its amplitude control input.

A signal component phase detector has both a detection input electrically connected to the photodetector to receive its output signal. This signal component phase detector causes output signals to appear at its output representing amplitudes of components of signals occurring at its detection input based on a selected demodulation frequency. An amplitude modulation signal component phase detector has an output electrically connected to the balance control signal generating means amplitude control input, and has both a detection input electrically connected to the signal component phase detector output and a demodulation input, electrically connected to the amplitude modulation signal generator. The amplitude modulation signal component phase detector causes signals to appear at its output representing amplitudes of components of signals occurring at its detection input based on its demodulation input frequency. An integrator may be included in the amplitude modulation signal component phase detector ahead of its connection to the balance control signal generating means amplitude control input to eliminate errors over time.

A controlled frequency adjustment signal generator provides an output signal to the phase modulator at a selected operation frequency. The signal component phase detector extracts a desired signal component from the photodetector output signal and provides a signal based thereon to said controlled frequency adjustment signal generator to select a frequency of operation therefor. The controlled frequency adjustment signal generator typically has an output waveform that essentially follows the serrodyne waveform. An integrator may be included in the signal component selector ahead of its connection to the controlled frequency adjustment signal generator to eliminate errors over time. If the balanced control signal generating means is to serve as a resonance determination signal generating means, its output is provided to the signal component phase detector at a demodulation input thereof to select the demodulation frequency, otherwise a separate resonance determination signal generating means is provided for this purpose. Electromagnetic waves in the resonator coil may reach the corresponding photodetector either through the coupler initially described, or through a second coupler also connected to the coiled optical fiber to couple electromagnetic waves between it and another external optical fiber.

DETAILED DESCRIPTION OF THE PREFERRED EMBODIMENTS

Figure 1:
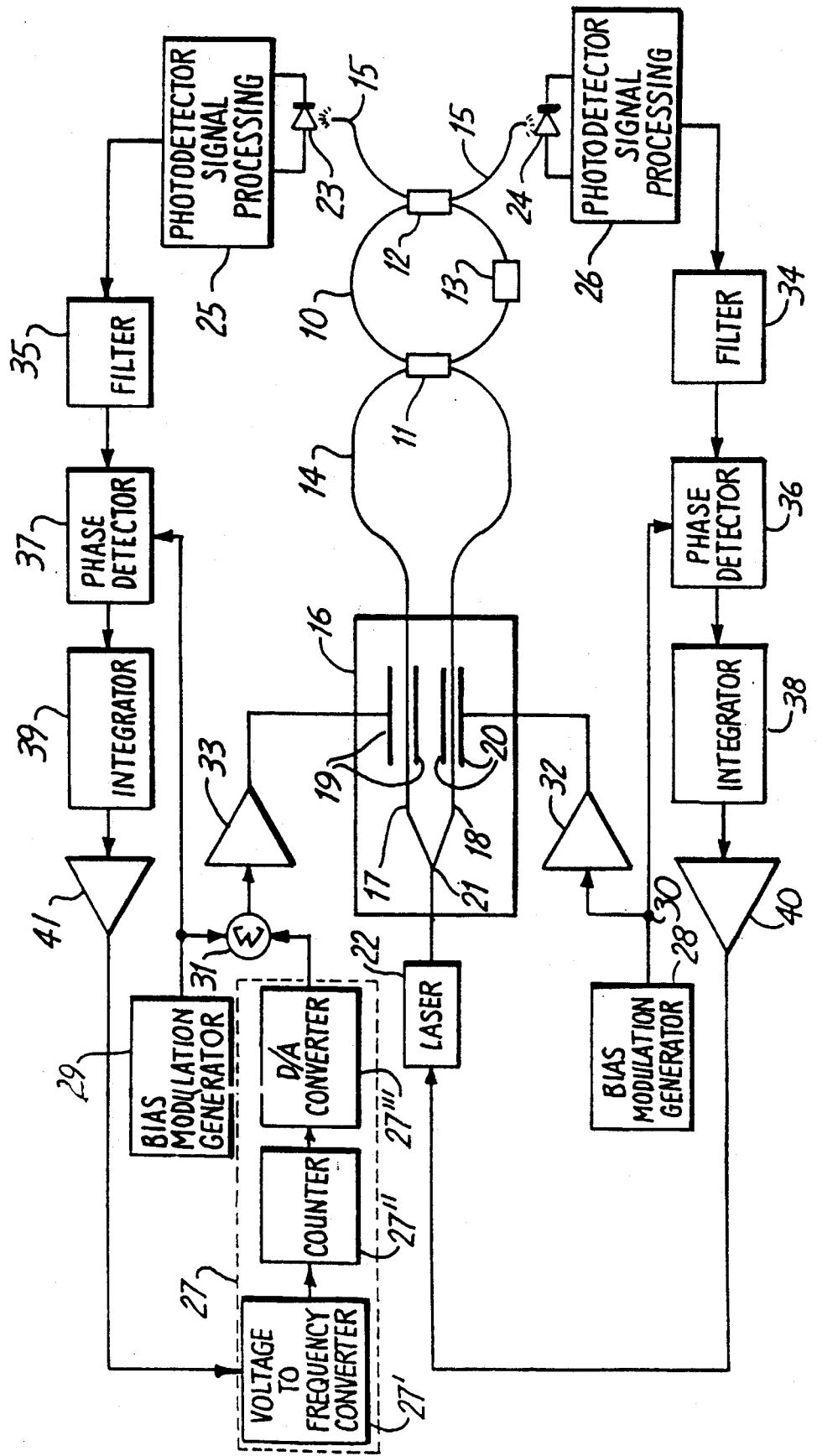
FIG. 1 shows a system schematic diagram of a resonator fiber optic gyroscope system known in the prior art combining a signal processing arrangement and an optical transmission path and device arrangement.
Figure 2A:
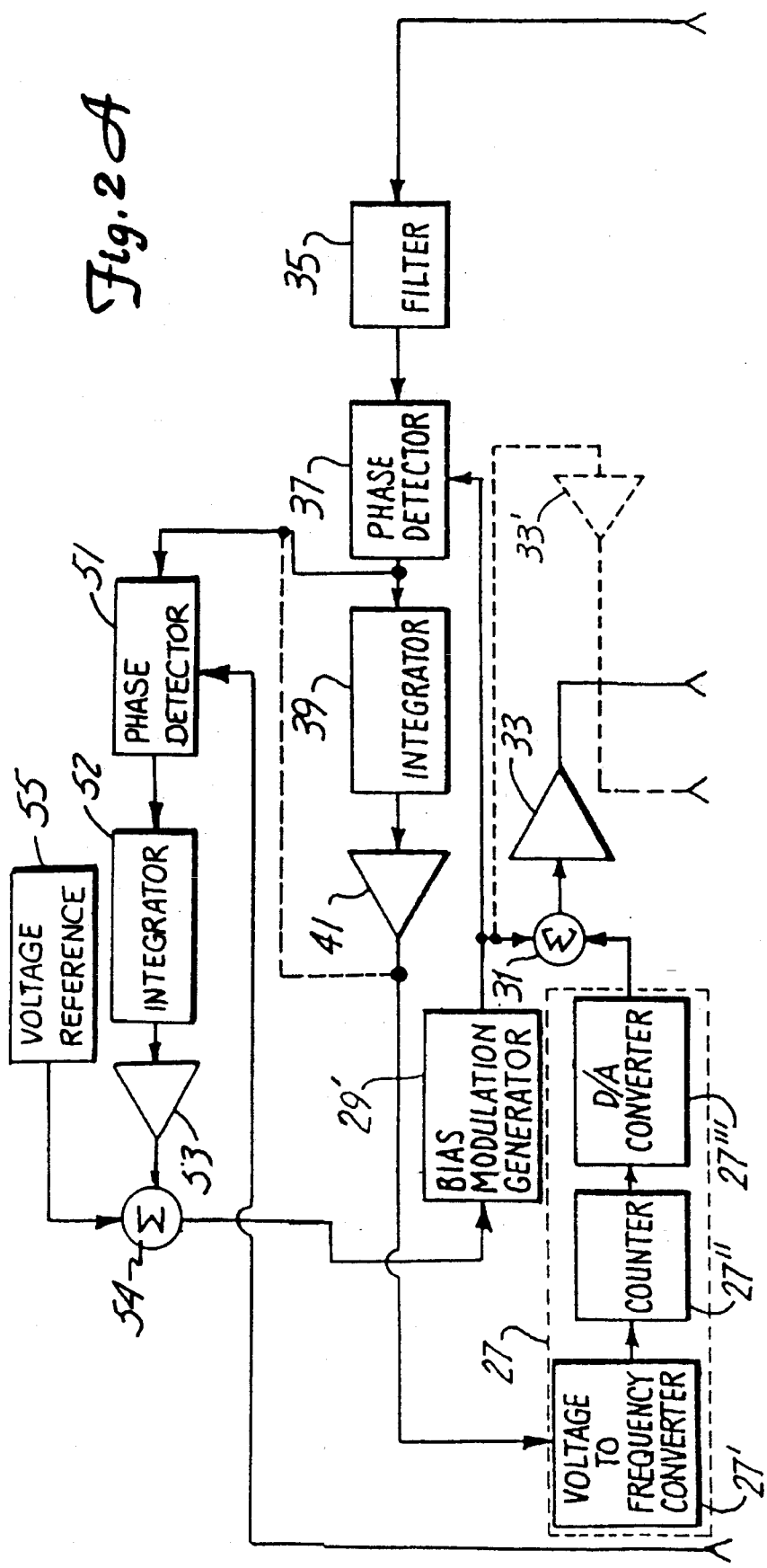
FIGS. 2A and 2B show a system schematic diagram of a resonator fiber optic gyroscope system embodying the present invention combining a signal processing arrangement and an optical transmission path and device arrangement.
Figure 2B:
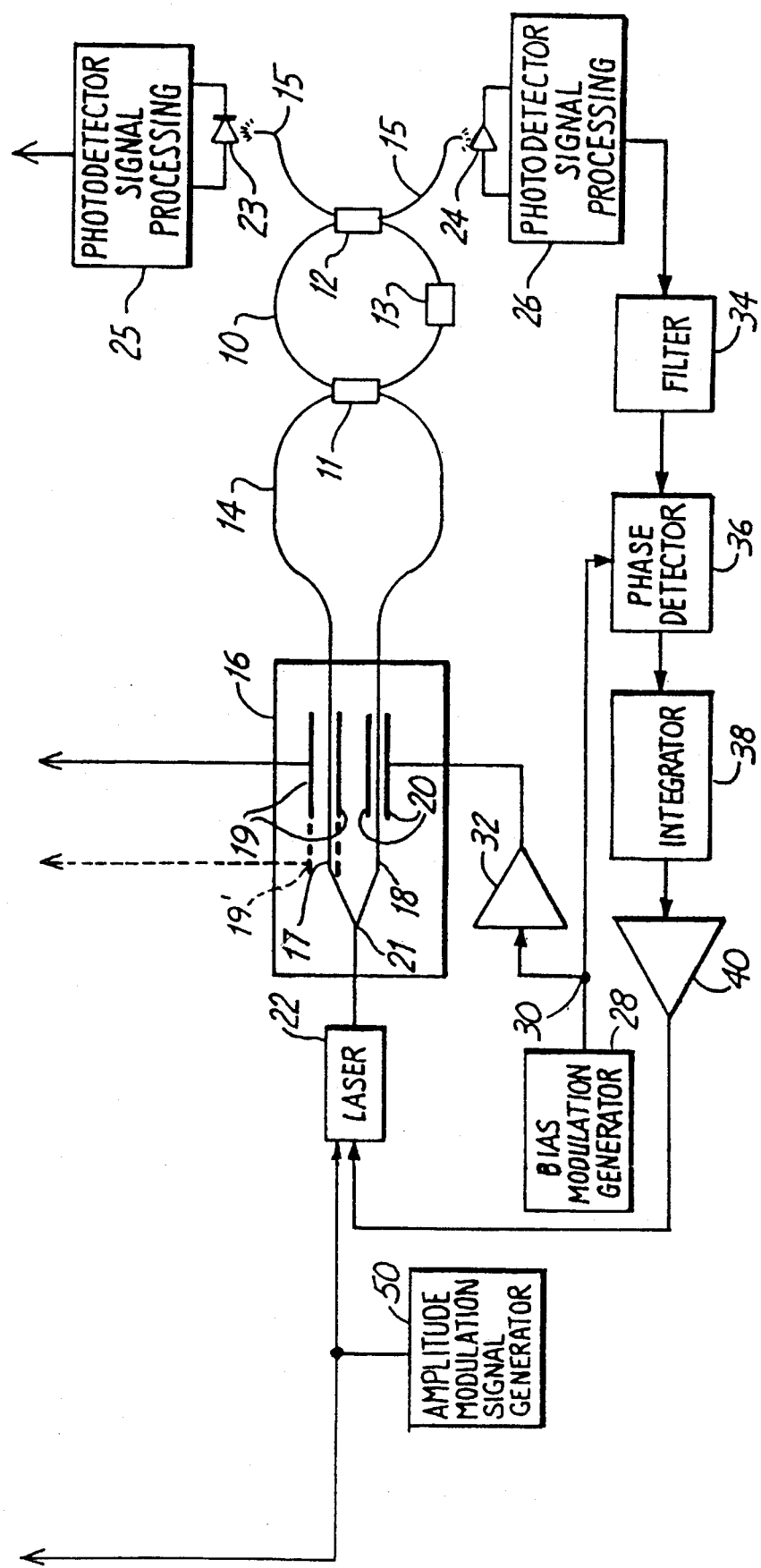

FIGS. 2A and 2B show an embodiment of the present invention in which a Kerr effect error control feedback loop has been added to the system shown in FIG. 1 to provide an output signal representing the rotation rate of the sensor with errors otherwise present therein, due to the optical Kerr effect, having been substantially reduced or eliminated. Designations used for the various devices, transmission paths and blocks in FIGS. 2A and 2B are the same as those which were used in FIG. 1 for the corresponding items shown there.

An alternative is shown in FIGS. 2A and 2B that was not shown in FIG. 1 by which summer 31 can be eliminated through use of another phase modulator, 19', shown in dashed line form in integrated optic chip 16 in FIG. 2B. In this situation, the output of controlled serrodyne generator 27 would be directly connected to the input of amplifier 33 with summer 31 eliminated. The output of bias modulator generator 29 in this arrangement follows the dashed line interconnection arrangement shown in FIG. 2A by first being connected to the input of another amplifier, 33', to supply the necessary voltage to operate phase modulator 19'. The output of amplifier 33' in FIG. 2A is connected by a dashed line to phase modulator 19' of FIG. 2B so that the electromagnetic waves passing therethrough are phase modulated in accordance with the signal provided by generator 29.

The rotation rate error $\Omega_{Ke}$ due to the Kerr effect in the portion of the system in FIGS. 2A and 2B common to FIG. 1 (or dashed line alternative), given above for FIG. 1 as $$\Omega_{Ke} = c_1 I_o \{(q^2-p^2) - c_2(\Delta\beta_m - \Delta\beta_n) L(p^2+q^2)\},$$

is, as previously indicated, linear with respect to the input electromagnetic wave intensity, $I_o$. In these circumstances, any changes occurring in the optical Kerr effect rotation rate error because of corresponding changes in the input intensity will also be linearly related, or $$\Delta\Omega_{Ke} = c_1\{(q^2-p^2) - c_2(\Delta\beta_m - \Delta\beta_n) L(p^2+q^2)\}\Delta I_o$$

where $\Delta\Omega_{Ke}$ is the optical Kerr effect rotation rate error change and $\Delta I_o$ is the wave intensity change.

Thus, if a change in input intensity $I_o$ is forced to occur through amplitude modulating that intensity to cause such a change therein, the linear relationship between intensity $I_o$ and rotational rate error $\Omega_{Ke}$, due to the optical Kerr effect, can be found since it will be the same linear relationship that occurs between changes in intensity $\Delta I_o$ and changes in the Kerr effect error $\Delta\Omega_{Ke}$. If the linear relationship between $\Delta\Omega_{Ke}$ and $\Delta I_o$ thus found is of a nature such that it can be forced to essentially a zero value, the output error due to the optical Kerr effect can be substantially reduced or eliminated.

Therefore, an amplitude modulation signal generator, 50, is provided in FIG. 2B connected to laser apparatus 22 for the purpose of amplitude modulating the electromagnetic waves provided by laser 22 to the input waveguide in integrated optics chip 16 at a modulation frequency $f_{am}$, typically in the one to a few kHz range using a sinusoidal waveform. Any suitable electromagnetic wave modulation apparatus can be used in laser 22 for this purpose, a typical arrangement would be to have a signal from generator 50 modulate the current flow through the laser diode.

Such an amplitude modulation of the electromagnetic wave intensity from laser 22 can be represented as $$I_o = \bar{I}_o + I_{am}\cos\omega_{am}t \triangleq \bar{I}_o + \Delta I_o,$$

where $\bar{I}_o$ represents the time average of the laser intensity, $I_{am}$ represents the amplitude of the amplitude modulation, and $\omega_{am}$ represents the radian frequency of the amplitude modulation or $\Omega_{am}=2\pi f_{am}$. Substituting from this equation the value for $\Delta I_o$ into the last equation given for $\Delta\Omega_{Ke}$ yields $$\Delta\Omega_{Ke}=c_1\{(q^2-p^2)-c_2(\Delta\beta_m-\Delta\beta_n)L(p^2+q^2)\}I_{am}\cos\omega_{am}t$$

Thus, the relationship between the change in the output error due to the optical Kerr effect and the amplitude modulation can be found in a frequency component at the modulation frequency $f_{am}$, and the relationship between the change in intensity and the optical Kerr effect error is seen to depend in part on a parameter which can be controlled, i.e. the bias modulation amplitudes $\Delta\beta_m$ and $\Delta\beta_n$. As a result, the output error due to the optical Kerr effect can be substantially reduced or eliminated by driving toward zero the amplitude modulation component at frequency $f_{am}$ present in either one of the bias modulation signal amplitudes at frequencies $f_m$ and $f_n$ obtained from photodetector signal processing circuits 26 or 25.

Doing so requires supplying a selected one of those bias modulation signal amplitudes at frequencies $f_m$ and $f_n$ obtained from a corresponding one of the intensities of electromagnetic waves impinging on photodetector signal processing circuits 26 or 25 through phase sensitive detectors 36 or 37 to provide a signal representing rotation rate including rotation rate errors. Such a signal is then supplied to a further phase sensitive detector which will demodulate that signal at frequency $f_{am}$ to obtain the amplitude component therein at that frequency linearly related to a corresponding optical Kerr effect variation. That phase sensitive detector will have an output signal following a discriminant characteristic over frequency suitable for operating as the error signal source for the remainder of the feedback loop used to control the selected bias modulation amplitude to reduce or eliminate that variation, and so simultaneously reduce or eliminate optical Kerr effect error.

Such a phase sensitive detector, 51, is shown in FIG. 2A receiving an input signal at its signal input from phase sensitive detector 37, although the input signal for phase sensitive detector 51 could also be taken at the output of integrator 39 or amplifier 41 with a suitable phase adjustment of the signal at its demodulation input from amplitude modulation signal generator 50. If this input signal is taken from phase detector 37 as shown in FIG. 2A, the frequency $\Omega_{am}=2\pi f_{am}$ must have a value so that it occurs outside the bandwidth of the feedback loop operating controlling serrodyne generator 27 and so cannot respond to phase changes between the counter-propagating waves in coil 10 occurring at frequencies near $\Omega_{am}$ which, if permitted, would null out any signals at $\Omega_{am}$ for detector 51. Another of these alternatives, in which the input signal for phase sensitive detector 51 is taken from the output of amplifier 41, is shown in dashed line form in FIG. 2A. If this input signal source alternative is used, the frequency $\Omega_{am}=2\pi f_{am}$ must have a value small enough to be within the bandwidth of this same feedback loop for controlling serrodyne generator 27 so that it can respond to phase changes in coil 10 occurring at frequencies near $\Omega_{am}$ if there is to be a signal for detector 51 to detect.

The output signal of phase sensitive detector 51, $v_{51}$, is the time average of (a) the signal at its signal input from the output of phase sensitive detector 37, or $v_{37}$, representing $\Delta\Omega_{Ke}$, and (b) the cosine signal at its demodulation input from amplitude modulation signal generator 50, or $v_{50}$, both multiplied together, this time average thereof being taken over the period of the modulation signal, $T_{am}=2\pi/\Omega_{am}=1/f_{am}$. Hence, the output signal $v_1$ of phase sensitive detector 51 can be represented as $$v_{51}=\frac{G}{T_{am}}\int_0^{T_{am}}\Delta\Omega_{Ke}\cos\omega_{am}t\,dt.$$

The constant G represents the effective gains of bias and amplification electronics 25, filter 35, phase sensitive detectors 37 and 51, and amplitudes of the reference signal at its demodulation input from amplitude modulation signal generator 50. This constant further represents the proportionality between the signal received in photodetector 23 at $f_n$ and the rotation rate of coil 10, and the errors in that rate.

This error signal, the output signal of phase sensitive detector 51, will be used to adjust the bias modulation amplitude $\Delta\beta_n$ to drive that error signal to a value of zero because of the presence of an integrator, 52, in the supplemental feedback loop shown in FIG. 2A added to the system of FIG. 1. Integrator 52 receives at its integration input the output signal from phase detector 51 and provides a time integrated version of that signal at its output which is supplied to an amplifier, 53. The output from amplifier 53 is provided to a summing means, 54, where it is summed with a reference voltage from a voltage reference source, 55. The summed signals are provided at the output of summing means 54 to the input of a modified version of bias modulation generator 29 of FIG. 1, this modified version being designated 29' in FIG. 2A. The modification of bias modulation generator 29 of FIG. 1 is to permit its amplitude values to be adjusted by signals applied at a bias modulation amplitude controlled input, the input at which the signal from summing means 54 is supplied. Thus, bias modulation generator 29' of FIG. 2A has the capability of adjusting the amplitude $\Delta\beta_n$ of the bias modulation signal at frequency $f_n$ under the direction of signals applied at its bias modulation amplitude control input.

The output signal from phase sensitive detector 51 can be found by substituting, in this last equation representing that output signal, the value found for the change in the optical Kerr effect error due to laser 22 being amplitude modulated as set out in the equation preceding the last equation. Making this substitution, and performing the integration, provides the result $$v_{51} = \frac{GI_{am}}{2} c_1\{(q^2-p^2) - c_2(\Delta\beta_m - \Delta\beta_n)L(p^2+q^2)\}.$$

As indicated above, the added feedback loop will act to force this output of phase sensitive detector 51 to zero, i.e. force $V_{51}=0$. Substituting this value for $v_{51}$ in the previous equation therefor yields the value of the amplitude for the bias modulation signal at frequency $f_n$ to be provided by bias modulation generator 29' to cause the relationship between intensity and the error due to the optical Kerr effect to take a value of zero, or $$\Delta\beta_n = \Delta\beta_m - \frac{q^2-p^2}{c_2L(q^2+p^2)}$$

Substituting this value for $\Delta\beta_n$ into the equation above given for the error due to the optical Kerr effect, $\Omega_{Ke}$, demonstrates the desired result for the optical Kerr effect error of $$\Omega_{Ke} = c_1 I_o \left\{ (q^2-p^2) - c_2\left[\Delta\beta_m - \Delta\beta_m - \frac{q^2-p^2}{c_2L(q^2+p^2)}\right]L(p^2+q^2) \right\}$$

$$= 0$$

Thus, the addition of the feedback loop in FIGS. 2A and 2B permits the substantial elimination of the error due to the optical Kerr effect.

Note that the reference voltage provided by voltage reference generator 55 is used to set desired initial conditions into the system. The value of the reference voltage at the output of generator 55 may be chosen to reduce errors due to other sources in the system, or to adjust the sensitivity of the system output signal, and the like.

There are a number of variations in implementation of a resonator fiber optic gyroscope system which differ from the core system shown in FIGS. 1, 2A and 2B. However, the error reduction arrangement added to the basic system of FIG. 1 in FIGS. 2A and 2B can also, in essence, be used with such variants of the basic system shown in FIG. 1.

For instance, the systems shown in FIGS. 1 and 2 are often termed "transmissive" resonator fiber optic gyroscope systems. A "reflective" resonator fiber optic gyroscope system is another alternative which is shown in FIG. 3, and in which the optical Kerr effect rotational rate is again reduced or eliminated by use of essentially the same error reduction system.

The major difference in the "reflective" resonator fiber optic gyroscope system is that there is but a single coupler optically connecting resonator 10 with the remainder of the system. That is, a coupler designated 11,12 is shown in FIG. 3 which couples electromagnetic waves into resonator 10 from, and out of resonator 10 to, an external optical fiber designated 14,15, serving as both the input optical fiber and the output optical fiber for the system. This is possible because of the use of two further optical couplers, 100 and 101, which couple electromagnetic waves from external optical fiber 14,15 to photodetectors 24 and 23, respectively.

The outputs of these photodetectors are provided to corresponding photodetector bias and signal processing circuits, 26 and 25, respectively. Photodetector bias and signal processing circuits 26 and 25 then provide signals to the same kinds of feedback loop arrangements in FIG. 3 as similarly designated photodetector bias and signal processing circuits do in the systems of FIGS. 2A and 2B.

Figure 3:
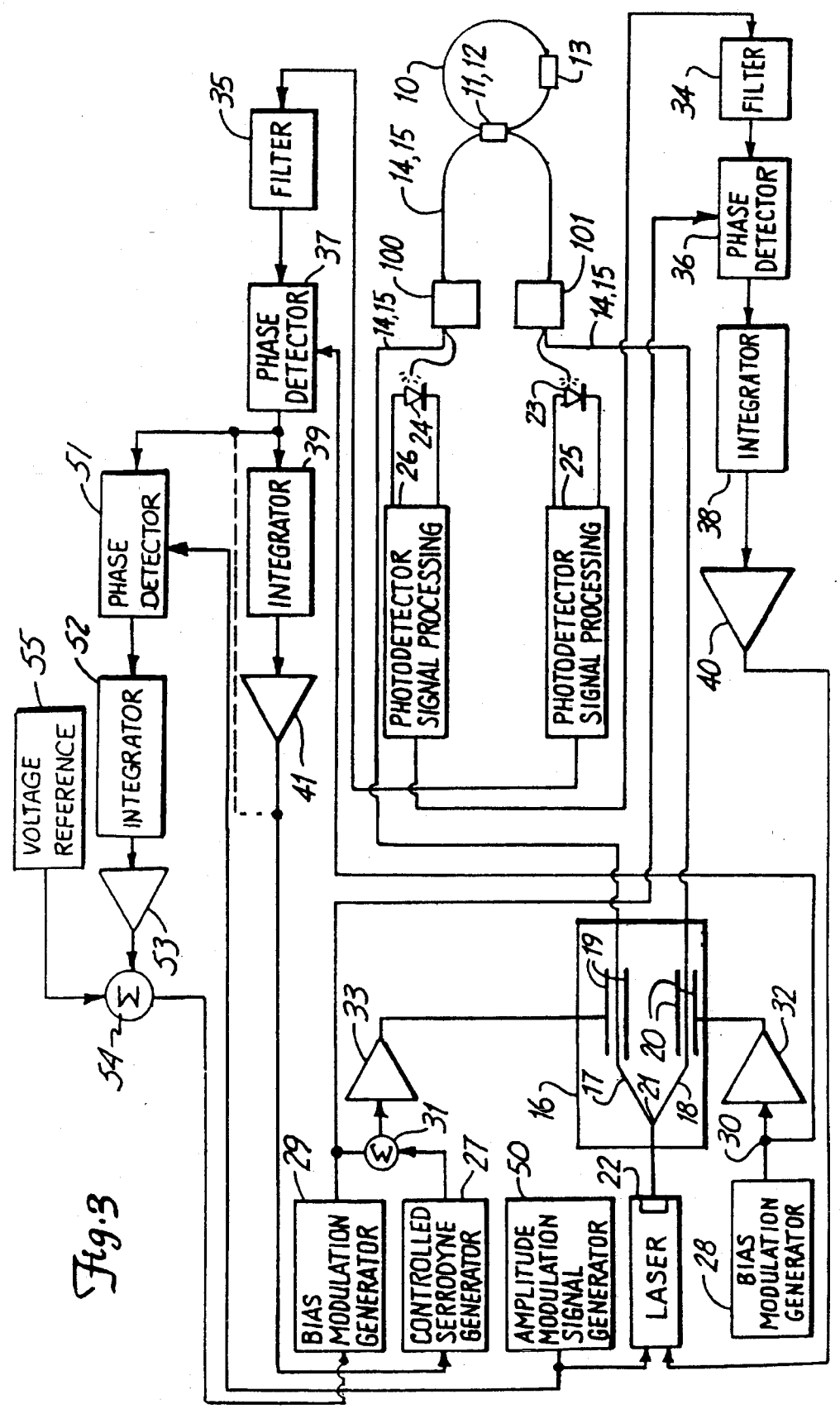
FIG. 3 shows a system schematic diagram of a further resonator fiber optic gyroscope system embodying another implementation of the present invention combining a signal processing arrangement and an optical transmission path and device arrangement.

Again, the input signal for phase sensitive detector 51 can be taken as the output signal of phase sensitive detector 37 as shown in solid lines in FIG. 3, or that input signal can be taken from the output signal from integrator 39 or amplifier 41. Here too, the example of taking the input signal for phase sensitive detector 51 from the output of amplifier 41 is shown in dashed line form.

Once again, the output signal of phase detector 51 is supplied to integrator 52 wherein it is time integrated and supplied to amplifier 53. Summing means 54 again obtains the time integrated signal from the output of amplifier 53 and combines it with a signal from voltage reference 55 to supply the combination to the amplitude control input of bias modulation generator 29'. Once again, this added feedback loop just described provides the reduction or elimination of errors due to the optical Kerr effect in the same manner as done in the corresponding error control feedback loop shown in FIG. 2A.

The major difference in operation here is that the electromagnetic waves reaching photodetectors 23 and 24 are not only those waves which have been circulating in resonator 10 but also corresponding portions of the input electromagnetic waves which are not coupled into resonator 10 by optical coupler 11,12. Thus, there are two pairs of electromagnetic waves in external fiber 14,15 with each member of each pair following a different path than the other, and with each pair reaching a corresponding one of photodetectors 23 and 24. This leads to each pair member interfering with the other in that pair in impinging on the photodetector corresponding to that pair. That is, the electric field components of the electromagnetic waves reaching photodetector 23 can be represented as:

$$E_{d\text{-}23} = c_1 q E'_{in} + c_2 E_{ccw}$$

where $E_{d\text{-}23}$ represents the electric field component of the electromagnetic waves reaching photodetector 23, $qE'_{in}$ in represents the input electromagnetic radiation provided through integrated waveguide 17, $E_{ccw}$ represents the counterclockwise electromagnetic waves which have been coupled back into external fiber 14,15 from resonator 10, and constants $c_1$ and $c_2$ represent the effects of various fractional couplings, losses, and phase delays on these electromagnetic wave components reaching photodetector 23.

Similarly, the electric field components of the electromagnetic waves reaching photodetector 24 can be represented as:

$$E_{d\text{-}24} = c_3 p E'_{in} + c_4 E_{cw}$$

with $E_{d\text{-}24}$ representing the electric field component of the electromagnetic waves reaching photodetector 24, $pE'_{in}$ representing the electromagnetic wave electric field component in external fiber 14,15 provided through integrated waveguide 18, $E_{cw}$ representing the clockwise traveling electromagnetic waves which have been coupled back into external optical fiber 14,15 from resonator 10, and constants $c_3$ and $c_4$ again representing various fractional couplings, losses and phase delays on these electromagnetic wave electric field components reaching photodetector 24.

Because the electric field components from two different optical paths in the electromagnetic waves reaching photodetectors 23 and 24 will interfere with each other upon arrival, the intensities at these detectors must be written as $$I_{d-23} = E_{d-23} \cdot E^*_{d-23} = |c_1 q E'_{in}|^2 + |c_2 E_{ccw}|^2 + 2|c_1 q E'_{in}||c_2 E_{ccw}|\cos\sigma_1$$

as $$d_{d-24} = E_{d-24} \cdot E^*_{d-24} = |c_3 p E'_{in}|^2 + |c_4 E_{cw}|^2 + 2|c_3 p E'_{in}||c_4 E_{cw}|\cos\sigma_2$$

with $\sigma$ being the phase difference between the components of the electromagnetic waves from two paths reaching a corresponding photodetector. As a result, the equations characterizing the system of FIG. 3 will differ somewhat from the equations given previously characterizing the system of FIGS. 2A and 2B. In fact, the occurrence of resonance in resonator 10 leading to a peak in the electromagnetic energy therein at the frequency given such resonance will lead to a cancellation at the photodetectors in FIG. 3 so that resonance is represented by a null in the intensity impinging on those photodetectors. Nevertheless, an analysis of the system of FIG. 3 taking these differences into account will yield equations showing a similar result for the optical Kerr effect rotational rate error. Thus, a similar error reduction arrangement can be used with the system of FIG. 3 as was used with the system of FIGS. 2A and 2B.

As described above, the system shown in FIGS. 2A and 2B, and in FIG. 3, succeed in eliminating the optical Kerr effect error through adjusting the amplitude $\Delta\beta_n$ of the bias modulation signal at frequency $f_n$ in a further feedback loop. This loop is established by adding another phase detector at the output of the phase detector following the corresponding photodetector obtaining a signal from coil 10, with the resulting loop operating the corresponding bias modulation generator as the loop actuator. Although such a feedback loop has been shown to achieve the desired goal of eliminating the optical Kerr effect error, there are other error sources in coil 10 which have been found possible to reduce or eliminate by also adjusting the amplitudes of the bias modulation signals. One such example is the occurrence of errors due to backscattering of electromagnetic waves propagating in the optical fiber material of resonator 10 due to fluctuations in the refractive index along the propagation path therein due to splices, impurities or minute cracks all of which can leave such waves being reflected to travel in the opposite direction.

Thus, to avoid conflicting demands on the bias modulation signal amplitudes, there is an advantage to canceling the optical Kerr effect rotation rate error by an alternative method at least in some situations. Such an alternative is available by modulating the electromagnetic waves directly in integrated optics chip 16 by providing another signal to the phase modulators in that chip or by adding a further phase modulator therein to receive that signal. The additional signal for this supplemental modulation can be provided by a controlled sinusoidal signal generator to thus introduce a further frequency component into the electromagnetic waves. If, for instance, an added phase modulator provided in integrated optics chips 16 is positioned about integrated waveguide 17, the input electromagnetic wave to resonator 10 from that waveguide will then have an instantaneous electric field frequency of $$f_0 + f_1 - f_n \Delta\phi_n \sin\Omega_n t - f_b \Delta\phi_b \sin\Omega_b t$$

wherein $f_b$ is the added frequency from the supplementary controlled sinusoidal generator, and $\Delta\phi_b$ is the amplitude of this supplementary bias modulation phase change at frequency of $f_b$. The frequency $f_b$ should be of a value that is large compared to the frequencies of the output signals from any of the other signal generators in the system of FIGS. 4A and 4B, sufficiently large so particularly that several cycles of this sinusoidal signal are completed during each cycle of the bias modulation signals $f_m$ and $f_n$ so that it appears effectively as an average value during such cycles. Such an introduction will change the effective propagation "constant" $\beta_{ccw}$ in coil 10 to $$\beta_{ccw} = \beta_{0-1} - \Delta\beta_n \sin\Omega_n t - \Delta\beta_b \sin\Omega_b t,$$

where $$\Delta\beta_b = \frac{2\pi n_{eff}}{c} f_b \Delta\phi_b$$

Figure 4A:
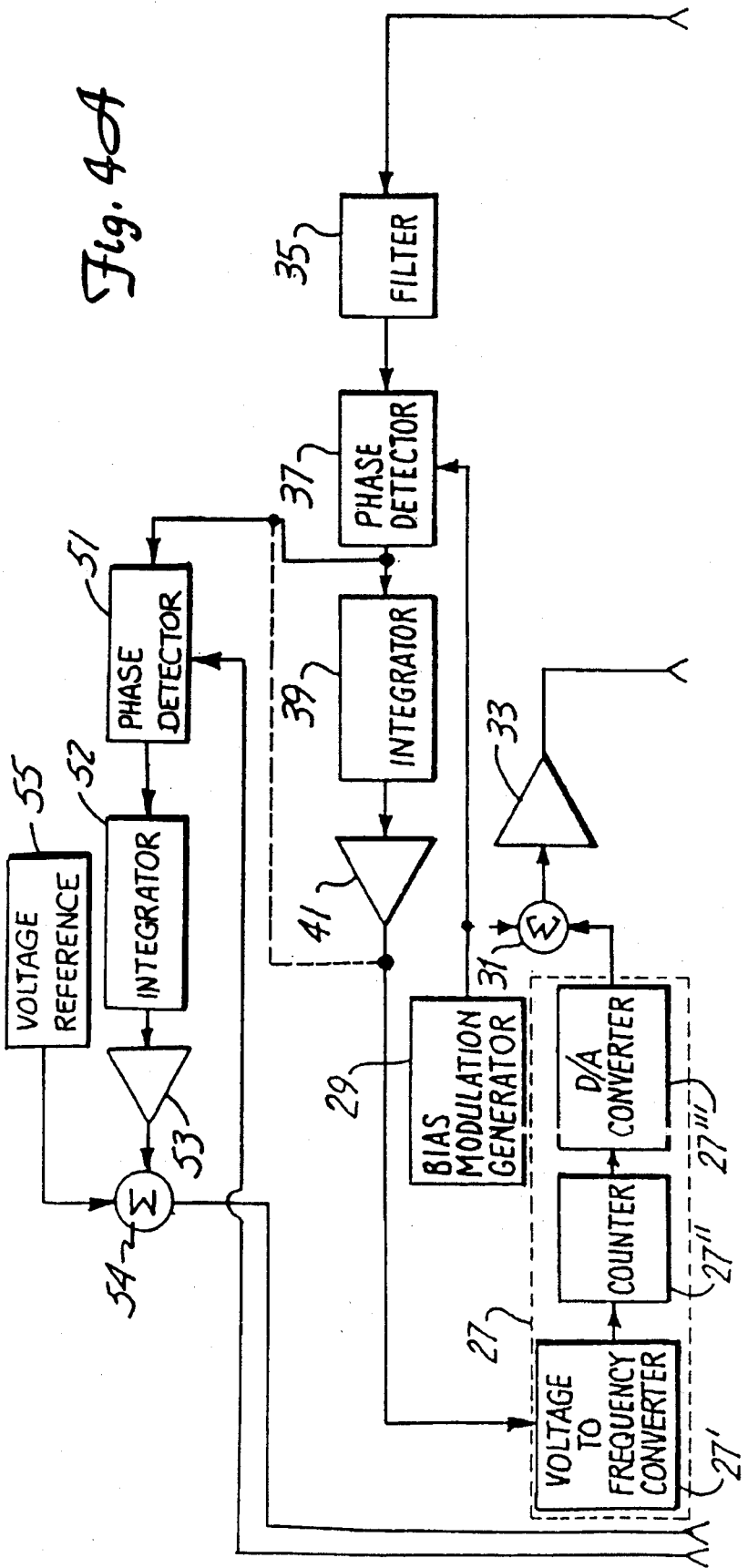
FIGS. 4A and 4B show a system schematic diagram of a resonator fiber optic gyroscope system embodying a further implementation of the present invention combining a signal processing arrangement and an optical transmission path and device arrangement.
Figure 4B:
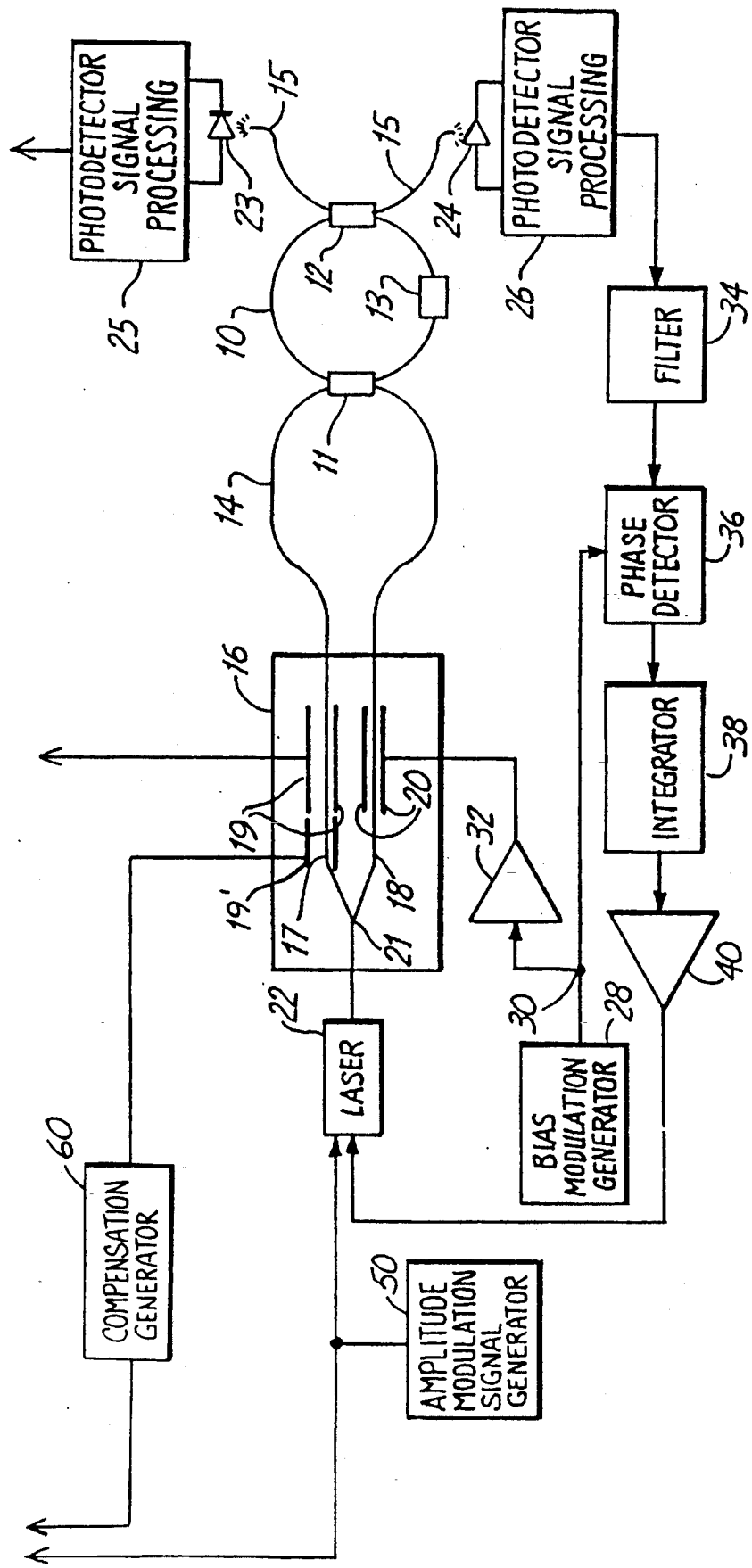

Such a system is shown in FIGS. 4A and 4B. Again, designations used for the various devices, transmission paths and blocks in FIGS. 4A and 4B are the same as those which were used in FIGS. 1, 2A and 2B for corresponding items shown there. Rather than the output of summing means 54 in FIG. 2A going to the amplitude control in bias modulation generator 29' as shown in that figure, the output of summer 54 in FIG. 4A goes to the amplitude control input of a supplementary sinusoidal output compensating generator, 60, shown in FIG. 4B. The output of this compensating generator is in this last figure connected to added phase modulator 19' in integrated optic chip 16 (rather than providing for an option of having the bias modulation generator 29 signal being applied to that phase modulator as indicated in FIG. 2A). The bias modulation generator in FIG. 4A has again been designated 29 since there is no longer an amplitude control input used therewith.

The introduction of this compensating signal through waveguide 19' changes the behavior of the counterclockwise electromagnetic waves in coil 10. Although the intensity of these waves can still be written as:

$$I_{ccw}(t,z) = E_{ccw} \cdot E^*_{ccw} = |t|^2 p^2 E^{2in} e^{-\alpha(L-z)} \times$$

$$\frac{1}{(1-R)^2 + 4R\sin^2\left(\frac{\Delta_{ccw} + \theta_{Kccw}}{2}\right)} \text{ for } l_1 < z \leq L$$

and $$I_{ccw}(t,z) = |t|^2 (1-\gamma_2)(1-k_2) p^2 E^{2in} e^{-\alpha(L-z)} \times$$

$$\frac{1}{(1-R)^2 + 4R\sin^2\left(\frac{\Delta_{ccw} + \theta_{Kccw}}{2}\right)} \text{ for } o \leq z \leq l_1,$$

the expression for the total phase change of the counterclockwise wave over the optical path through resonator optical fiber coil 10, $\Delta_{ccw}$ except for the phase change due to the Kerr effect now becomes $$\Delta_{ccw} \underline{\Delta}\beta_{0-1} L - \Delta\beta_n L \sin\Omega_n t - \Delta\beta_b L \sin\Omega_b t - \phi_r + \theta.$$

As a result, the time average change in phase in the clockwise and counterclockwise directions from resonance set by the bias modulation feedback loop becomes $$\overline{\Delta_{ccw}} = -\delta I_0 [p^2 \overline{\Gamma(\Delta\beta_n \sin\omega_n t + \Delta\beta_b L \sin\omega_b t)} + 2q^2 \overline{\Gamma(\Delta\beta_m L \sin\omega_m t)}].$$

Similarly, for the clockwise wave, the corresponding average becomes $$\overline{\Delta_{cw}} = -\delta I_0[q^2 \overline{\Gamma(\Delta\beta_m L\sin\omega_m t)} + 2p^2 \overline{\Gamma(\Delta\beta_n L\sin\omega_n t + \delta\beta_b L\sin\omega_b t)}].$$

As a result, the initial expression for the rotation rate error due to the optical Kerr effect based on these quantities becomes $$\Omega_{KE} =$$

$$\frac{\lambda c}{8\pi A} \delta I_0 \left[ q^2 \overline{\Gamma(\Delta\beta_m L\sin\omega_m t)} - p^2 \overline{\Gamma(\Delta\beta_n L\sin\omega_n t + \Delta\beta_b L\sin\omega_b t)} \right].$$

The two time averages occurring in this last expression for the rotation rate error due to the optical Kerr effect are evaluated as $$\overline{\Gamma(\Delta\beta_n L\sin\omega_n t + \Delta\beta_b L \text{SIN}\omega_b t)} =$$

$$\frac{1}{T} \int_0^T \frac{1}{1 + R^2 - 2R\cos(\Delta\beta_n L\sin\omega_n t + \Delta\beta_b L\sin\omega_b t)} dt \cong$$

$$\frac{1}{(1-R)^2} - \frac{R\Delta\beta_n^2 L^2}{2(1-R)^4} - \frac{R\Delta\beta_b^2 L^2}{2(1-R)^4} \text{ for } \omega_b \gg \omega_n \cong$$

$$\frac{1}{(1-R)^2} - \frac{R(\Delta\beta_n^2 + \Delta\beta_q^2)L^2}{2(1-R)^4}$$

and $$\overline{\Gamma(\Delta\beta_m L\sin\omega_m t)} =$$

$$\frac{1}{T} \int_0^T \frac{1}{1 + R^2 - 2R\cos(\Delta\beta_m L\sin\omega_m t)} dt \cong$$

$$\frac{1}{(1-R)^2} - \frac{R\Delta\beta_m^2 L^2}{2(1-R)^4}$$

These results can be rewritten if the definitions $$\Delta\beta_r^2 \triangleq \Delta\beta_n^2 + \Delta\beta_b^2,$$

$$\Delta\beta \triangleq \frac{\Delta\beta_m + \Delta\beta_r}{2},$$

and $$\Delta\beta_\Delta \triangleq \frac{\Delta\beta_m - \Delta\beta_r}{2}$$

are made. Then, each time average becomes $$\overline{\Gamma(\Delta\beta_n L\sin\omega_n t + \Delta\beta_b L\sin\omega_b t)} \cong$$

$$\frac{1}{(1-R)^2} - \frac{RL^2\Delta\beta^2}{2(1-R)^4} - \frac{RL^2\Delta\beta\Delta\beta_\Delta}{(1-R)^4},$$

and $$\overline{\Gamma(\Delta\beta_m L\sin\omega_m t)} \cong \frac{1}{(1-R)^2} - \frac{RL^2\Delta\beta^2}{2(1-R)^4} + \frac{RL^2\Delta\beta\Delta\beta_\Delta}{(1-R)^4}.$$

Substituting these results for the time averages into the preceding expression for the rotation rate error due to the optical Kerr effect yields $$\Omega_{Ke} = \frac{\lambda c}{8\pi A} \delta I_o \left[ \frac{q^2}{(1-R)^2} - \frac{p^2}{(1-R)^2} - \frac{q^2 R\Delta\beta^2 L^2}{2(1-R)^4} + \frac{p^2 R\Delta\beta^2 L^2}{2(1-R)^4} \right]$$

Algebraic manipulation yields $$\Omega_{ke} = \frac{\lambda c \delta I_o [2(1-R)^2 - R\Delta\beta^2 L^2]}{16\pi A(1-R)^4} \left[ (q^2 - p^2) - (q^2 + p^2) \frac{2R\Delta\beta L^2}{2(1-R)^2 - R\Delta\beta^2 L^2} \Delta\beta_\Delta \right].$$

Making the definitions $$C_1 \triangleq \frac{\lambda c \delta [2(1-R)^2 - R\Delta\beta^2 L^2]}{16\pi A(1-R)^4}$$

and $$C_2 \triangleq \frac{R\Delta\beta L}{2(1-R)^2 - R\Delta\beta^2 L^2},$$

this rotation rate error becomes $$\Omega_{ke} = C'_1 I_0 \{ (q^2 - p^2) - C'_2 (\Delta\beta_m - \Delta\beta_r) L(p^2 + q^2) \}.$$

This last expression is the same expression obtained above for the system of FIGS. 2A and 2B but with different definitions for constants $C'_1$ and $C'_2$ then there were for constants $C_1$ and $C_2$ found for that system. In addition, $\Delta\beta_r$ here replaces $\Delta\beta_n$ which appeared in the earlier error equation for the system of FIGS. 2A and 2B.

Hence, once again, rotational rate error due to the optical Kerr effect is seen to depend linearly on the input intensity of the electromagnetic waves provided by laser 22. As a result, also again, any change occurring in the optical Kerr effect rotation rate error because of a corresponding change in the input intensity will also be linearly related. Thus, if the same amplitude modulated electromagnetic wave intensity from laser 22 is provided by amplitude modulation signal generator 50, the relationship between the change in output error due to the optical Kerr effect in the amplitude modulation can again be found in a frequency component at modulation frequency $f_{am}$ as seen from the resulting expression $$\Delta\Omega_{kc} = C'_1 \{ (q^2 - p^2) - C'_2 L(p^2 + q^2)(\Delta\beta_m - \sqrt{\Delta\beta_n^2 + \Delta\beta_b^2}) \} I_{am} \cos\omega t,$$

where the substitution $$\Delta\beta_r = \sqrt{\Delta\beta_n^2 + \Delta\beta_b^2}$$

has been made. Once again, the relationship between the change in intensity and the optical Kerr effect error is seen to depend in part on a parameter which can be controlled, $\Delta\beta_b$, which differs from the bias modulation amplitudes $\Delta\beta_m$ and $\Delta\beta_n$. As a result, the output error due to the optical Kerr effect can be substantially reduced or eliminated by driving toward zero the amplitude modulation component at frequency of $_{am}$ that is present in the bias modulation signal amplitude at frequency $f_n$ obtained from photodetector signal processing circuit 25 as before, through filter 35, phase sensitive detector 37 and phase sensitive detector 51. The feedback loop containing these components again has the error signal provided at the output of phase detector 51 to be used to adjust the supplementary modulation amplitude $\Delta\beta_b$ in such a manner to drive this error signal to a value of zero in view of the presence of integrator 52.

The output signal of phase sensitive detector 51 is found as before, but using instead the expression just obtained for the change in the optical Kerr effect error due to the output intensity of laser 22 being amplitude modulated, yielding $$v_{51} = \frac{GI_{am}}{2} C'_1\{(q^2-p^2) - C'_2L(p^2+q^2)(\Delta\beta_m - \sqrt{\Delta\beta_n^2 + \Delta\beta_b^2})\}.$$

If the signal $v_{51}$ is forced to zero, that is, $v_{51}=0$, the resulting expression is obtained for the supplementary modulation amplitude $$\Delta\beta_b = \sqrt{\left[\Delta\beta_m - \frac{(q^2-p^2)}{C'_2L(p^2+q^2)}\right]^2 - \Delta\beta_n^2}.$$

This value for $\Delta\beta_b$ can be shown to force the error due to the optical Kerr effect to zero. Thus, the supplementary feedback loop involving phase sensitive detector 51, integrator 52, amplifier 53, compensating generator 60 and phase modulator 19' also permits substantial elimination of the error in the rotational rate information due to the optical Kerr effect.

Figure 5:
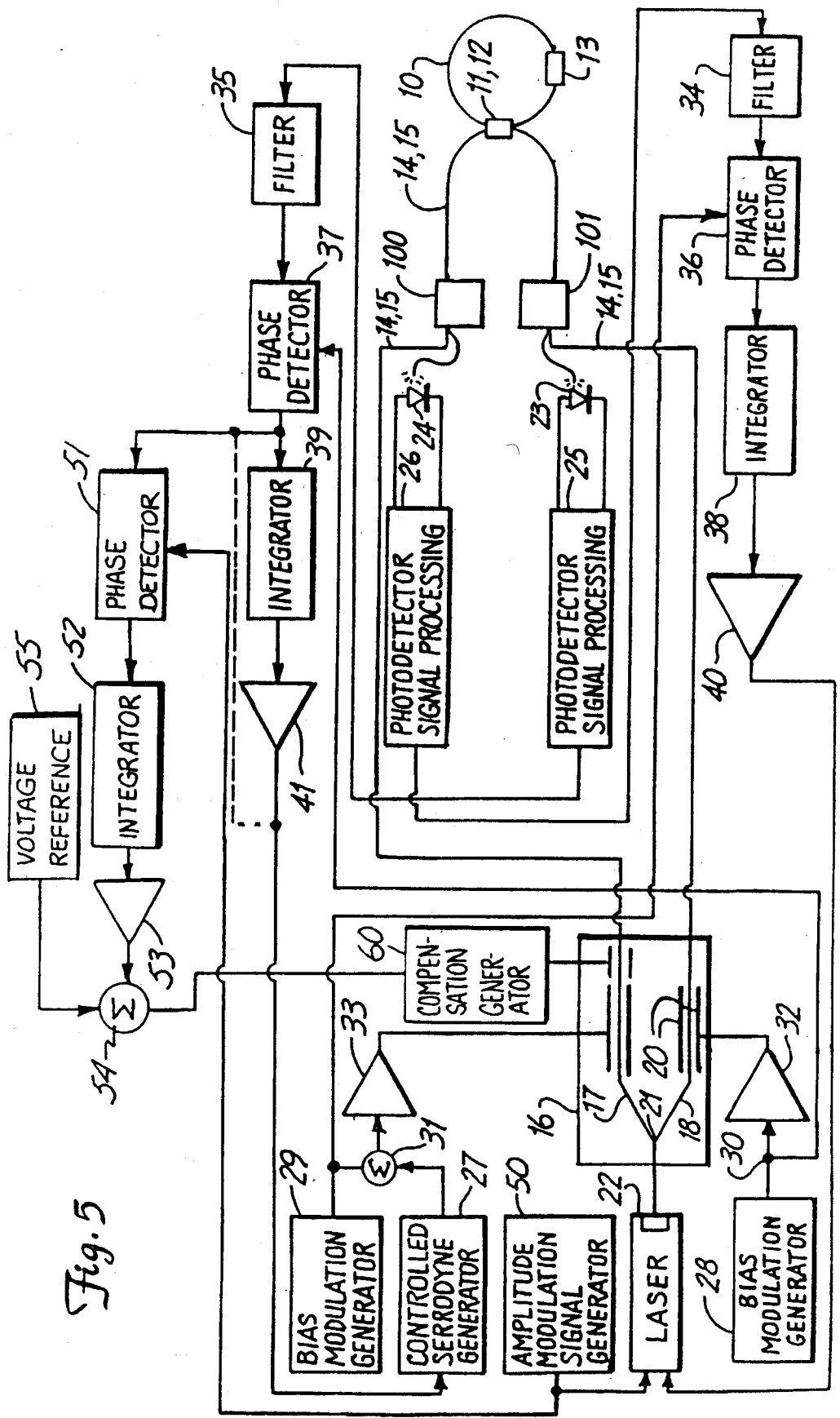
FIG. 5 shows a system schematic diagram of a further resonator fiber optic gyroscope system embodying yet another implementation of the present invention combining a signal processing arrangement and an optical transmission path and device arrangement.

FIG. 5 shows a reflective resonator fiber optic gyroscope system which uses essentially the same error reduction system as was used in the transmissive system of FIGS. 4A and 4B. Except for this error reduction system, the system of FIG. 5 is substantially like the system of FIG. 3.

Although the present invention has been described with reference to preferred embodiments, workers skilled in the art will recognize that changes may be made in form and detail without departing from the spirit and scope of the invention.

What is claimed is:

1. An error reducer for reducing rotation rate errors arising because of an optical Kerr effect in a coiled optical fiber in a rotation sensor capable of sensing rotation about an axis of said coiled optical fiber formed in a closed optical path in conjunction with at least a first coil coupler which is connected therewith such that electromagnetic waves can be coupled between said coiled optical fiber and a first external optical fiber, said rotation sensing based on having opposing coiled optical fiber electromagnetic waves propagating through said coiled optical fiber in opposing directions so as to result in each of said opposing coiled optical fiber electromagnetic waves impinging at least in part on a corresponding one of first and second photodetectors in a plurality of photodetectors each coupled to a selected one of said coiled optical fiber and said external optical fiber with at least one of said opposing coiled optical fiber electromagnetic waves propagating in one of said opposing directions being subject to having phasing thereof varied by a first set of selected signals supplied to a first input of a first phase modulator, said first photodetector providing an output signal in response to such impingement thereon of a corresponding said opposing coiled optical fiber electromagnetic wave, which is representative of that wave, said error reducer comprising:

an amplitude modulation signal generator means capable of providing amplitude modulation component in said opposing coiled optical fiber electromagnetic waves;

a balance control signal generating means having an amplitude control input and an output electrically connected to said first phase modulator so as to be capable of providing a phase modulation component in a said opposing coiled optical fiber electromagnetic wave at a selected balance control frequency, said balance control signal generating means being further capable of adjusting values of amplitude of said phase modulation component provided thereby in accord with a second set of selected signals provided at said amplitude control input thereof;

a first signal component phase detection means having an output and having a detection input electrically connected to said first photodetector to receive said first photodetector output signal, said first signal component phase detection means being capable of providing output signals at said output thereof representing amplitudes of components of signals occurring at said detection input thereof based on a first selected demodulation frequency; and an amplitude modulation signal component phase detection means having an output electrically connected to said balance control signal generating means amplitude control input and having both a detection input electrically connected to said first signal component phase detection means output to receive said first signal component phase detection means output signal, and a demodulation input, electrically connected to said amplitude modulation signal generator means, said amplitude modulation signal component phase detection means being capable of using signals supplied at said demodulation input thereof, having a substantial demodulation signal component therein at a second selected demodulation frequency, to cause the second set of selected signals to appear at said output thereof representing amplitudes of components of signals occurring at said detection input thereof based on said demodulation frequency.

2. The apparatus of claim 1 wherein said first external optical fiber is positioned with respect to said first phase modulator such that electromagnetic waves passing through at least a portion thereof also pass through said first phase modulator so as to be subject to having phases thereof varied in response to selected signals applied to said first phase modulator first input.

3. The apparatus of claim 1 further comprising a first resonance determination signal generating means having an output thereof electrically connected to a selected one of said first phase modulator and any supplementary phase modulators provided, so as to be capable of providing a phase modulation component in a said opposing coiled optical fiber electromagnetic wave at a selected first resonance monitoring frequency, and so connected thereto through a resonance determination summing means having a first input electrically connected to said first resonance determination signal generating means output and having an output electrically connected to said selected one of first and supplementary phase modulators, said resonant determination summing means also having a second input and being capable of combining a third set of selected signals provided at said first and second inputs thereof to provide an output signal on said output thereof based on such combined signals; and wherein said apparatus further comprises a controlled frequency adjustment signal generator means having a frequency adjustment input electrically connected to said first signal component phase detection means output and having an output electrically connected to said resonant determination summing means second input, said controlled frequency adjustment signal generator means being capable of providing an output signal at said output thereof having a basic waveform repeated at a selected first shift operation frequency of a value selected based on signals appearing on said frequency adjustment input; and further wherein said first signal component phase detection means has a demodulation input electrically connected to said first resonance determination signal generating means output, said first signal component phase detection means being capable of using signals supplied at said demodulation input thereof, having a substantial demodulation signal component therein at said demodulation frequency, to cause output signals to appear at said output thereof representing amplitudes of components of signals occurring at said detection input thereof based on said demodulation frequency.

4. The apparatus of claim 1 further comprising at least one supplementary phase modulator positioned with respect to said first phase modulator such that electromagnetic waves subject to having phases thereof varied in response to selected signals applied to said first phase modulator are also subject to having phases thereof varied in response to selected signals applied to said supplementary phase modulator; and wherein said apparatus yet further comprises a first resonance determination signal generating means having an output thereof electrically connected to a selected one of said first phase modulator and any of said supplementary phase modulators provided so as to be capable of providing a phase modulation component in a said opposing coiled optical fiber electromagnetic wave at a selected first resonance monitoring frequency, and a controlled frequency adjustment signal generator means having a frequency adjustment input electrically connected to said first signal component phase detection means output and having an output electrically connected to a selected one of said first phase modulator and any of said supplementary phase modulators provided so as to be capable of providing a phase modulation component in a said opposing coiled optical fiber electromagnetic wave, said controlled frequency adjustment signal generator means being capable of providing an output signal at said output thereof having a basic waveform repeated at a selected first shift operation frequency of a value selected based on signals appearing on said frequency adjustment input; and further wherein said first signal component phase detection means has a demodulation input electrically connected to said first resonance determination signal generating means output, said first signal component phase detection means being capable of using signals supplied at said demodulation input thereof, having a substantial demodulation signal component therein at said demodulation frequency, to cause output signals to appear at said output thereof representing amplitudes of components of signals occurring at said detection input thereof based on said demodulation frequency.

5. The apparatus of claim 1 wherein said balanced control signal generating means is a first resonance determination signal generating means having said amplitude control input and having said output, and wherein said balance control frequency is a first resonance monitoring frequency, and further wherein said first signal component phase detection means has a demodulation input electrically connected to said first resonance determination signal generating means output, said first signal component phase detection means being capable of using signals supplied at said demodulation input thereof, having a substantial demodulation signal component therein at said demodulation frequency, to cause output signals to appear at said output thereof representing amplitudes of components of signals occurring at said detection input thereof based on said demodulation frequency.

6. The apparatus of claim 2 wherein said first external optical fiber and said first phase modulator are part of a coiled optical fiber input means capable of having opposing electromagnetic waves, supplied from a common source of electromagnetic waves, propagate commonly through both of said first external optical fiber and said first phase modulator in opposite directions.

7. The apparatus of claim 2 wherein said coiled optical fiber is a single spatial mode optical fiber exhibiting birefringence so that differing indices of refraction occur along corresponding axes having an angular relationship with one another on cross sections of said optical fiber, and wherein said closed optical path including said coiled optical fiber has a transfer means therealong for transferring electromagnetic radiation propagating along one of said axes into propagating along another of said axes.

8. The apparatus of claim 2 wherein said coiled optical fiber is a single spatial mode optical fiber exhibiting birefringence so that differing indices of refraction occur along corresponding axes having an angular relationship with one another on cross sections of said optical fiber, and wherein said closed optical path including said coiled optical fiber has a polarizer therein for transmitting electromagnetic waves of a corresponding polarization along one said axis and blocking transmission of electromagnetic waves of another corresponding polarization along another said axis.

9. The apparatus of claim 2 wherein said first external optical fiber has first and second output couplers connected therewith such that electromagnetic waves can be coupled between said first external optical fiber and a corresponding output optical path leading to a corresponding one of said first and second photodetectors.

10. The apparatus of claim 2 wherein said coiled optical fiber has a second coil coupler connected therewith such that electromagnetic waves can be coupled between said coiled optical fiber and a second external optical fiber, said second coil coupler having a pair of ends each positioned so that electromagnetic waves emanating therefrom impinge on a corresponding one of said first and second photodetectors.

11. The apparatus of claim 3 wherein said basic waveform consists of a relatively long duration of substantially monotonically changing magnitude in one magnitude direction followed by a much shorter duration of substantially monotonically changing magnitude in an opposite magnitude direction.

12. The apparatus of claim 3 in which said second photodetector also provides an output signal in response to impingement thereon of a another corresponding said opposing coiled optical fiber electromagnetic wave, which is representative of such wave, and further comprising a second phase modulator with said first external optical fiber being positioned with respect to said second phase modulator such that electromagnetic waves passing through at least a portion thereof also pass through said second phase modulator so as to be subject to having phases thereof varied in response to selected signals applied to said second phase modulator first input, said first external optical fiber and said first and second phase modulators being part of a coiled optical fiber input means capable of having opposing electromagnetic waves, supplied from a common source means of electromagnetic waves, propagate commonly through each of said first external optical fiber and said first and second phase modulators in opposite directions, said common source means having a first control input at which provision of selected signals results in selected frequencies occurring in said electromagnetic waves provided thereby; and wherein said apparatus further comprises a second resonance determination signal generating means having an output electrically connected to said second phase modulator first input, said second resonance determination signal generator means being capable of providing an output signal containing a substantial signal component at a second resonance monitoring frequency; and yet further comprises a second signal component phase detection means having both a detection input, electrically connected to said second photodetector to receive said second photodetector output signal, and a demodulation input, electrically connected to said second resonance determination signal generating means output, and having an output electrically connected to said common source means first control input, said second signal component phase detection means being capable of using signals supplied at said demodulation input thereof, having a substantial demodulation signal component therein at a selected demodulation frequency, to cause signals to appear at said output thereof representing amplitudes of components of signals occurring at said detection input thereof based on said demodulation frequency.

13. The apparatus of claim 3 wherein said first signal component phase detection means further comprises an integrator electrically connected between said output thereof and said first resonance determination signal generating means amplitude control input.

14. The apparatus of claim 4 wherein said basic waveform consists of a relatively long duration of substantially monotonically changing magnitude in one magnitude direction followed by a much shorter duration of substantially monotonically changing magnitude in an opposite magnitude direction.

15. The apparatus of claim 4 in which said second photodetector also provides an output signal in response to impingement thereon of a corresponding said opposing coiled optical fiber electromagnetic wave which is representative of that wave, and further comprising a second phase modulator with said first external optical fiber being positioned with respect to said second phase modulator such that electromagnetic waves passing through at least a portion thereof also pass through said second phase modulator so as to be subject to having phases thereof varied in response to selected signals applied to said second phase modulator first input, said first external optical fiber and said first and second phase modulators being part of a coiled optical fiber input means capable of having opposing electromagnetic waves, supplied from a common source means of electromagnetic waves, propagate commonly through each of said first external optical fiber and said first and second phase modulators in opposite directions, said common source means having a control input at which provision of selected signals results in selected frequencies occurring in said electromagnetic waves provided thereby; and wherein said apparatus further comprises a second resonance determination signal generating means having an output electrically connected to said second phase modulator first input, said second resonance determination signal generator means being capable of providing an output signal containing a substantial signal component at a second resonance monitoring frequency; and yet further comprises a second signal component phase detection means having both a detection input, electrically connected to said second photodetector to receive said second photodetector output signal, and a demodulation input, electrically connected to said second resonance determination signal generating means output, and having an output electrically connected to said common source means first control input, said second signal component phase detection means being capable of using signals supplied at said demodulation input thereof, having a substantial demodulation signal component therein at a selected demodulation frequency, to cause signals to appear at said output thereof representing amplitudes of components of signals occurring at said detection input thereof based on said demodulation frequency.

16. The apparatus of claim 4 wherein said first signal component phase detection means further comprises an integrator electrically connected between said output thereof and said first resonance determination signal generating means amplitude control input.

17. The apparatus of claim 5 wherein said first resonance determination signal generating means has said output thereof also electrically connected to said first phase modulator through a resonance determination summing means having a first input electrically connected to said first resonance determination signal generating means output and having an output electrically connected to said first phase modulator first input, said resonant determination summing means also having a second input and being capable of combining selected signals provided at said first and second inputs thereof to provide an output signal on said output thereof based on such combined signals; and wherein said apparatus further comprises a controlled frequency adjustment signal generator means having a frequency adjustment input electrically connected to said first signal component phase detection means output and having an output electrically connected to said resonant determination summing means second input, said controlled frequency adjustment signal generator means being capable of providing an output signal at said output thereof having a basic waveform repeated at a selected first shift operation frequency of a value selected based on signals appearing on said frequency adjustment input.

18. The apparatus of claim 5 further comprising a supplementary phase modulator positioned with respect to said first phase modulator such that electromagnetic waves subject to having phases thereof varied in response to selected signals applied to said first phase modulator first input are also subject to having phases thereof varied in response to selected signals applied to a first input of said supplementary phase modulator; and wherein said apparatus yet further comprises said a controlled frequency adjustment signal generator means having a frequency adjustment input electrically connected to said first signal component phase detection means output and having an output electrically connected to said supplementary phase modulator first input, said controlled frequency adjustment signal generator means being capable of providing an output signal at said output thereof having a basic waveform repeated at a selected first shift operation frequency of a value selected based on signals appearing on said frequency adjustment input.

19. The apparatus of claim 12 wherein said common source has a second control input to which an output of said amplitude modulation means is electrically connected.

20. The apparatus of claim 15 wherein said common source has a second control input to which an output of said amplitude modulation means is electrically connected.

21. The apparatus of claim 17 wherein said basic waveform consists of a relatively long duration of substantially monotonically changing magnitude in one magnitude direction followed by a much shorter duration of substantially monotonically changing magnitude in an opposite magnitude direction.

22. The apparatus of claim 17 in which said second photodetector also provides an output signal in response to impingement thereon of a corresponding said opposing coiled optical fiber electromagnetic wave which is representative of such wave, and further comprising a second phase modulator with said first external optical fiber being positioned with respect to said second phase modulator such that electromagnetic waves passing through at least a portion thereof also pass through said second phase modulator so as to be subject to having phases thereof varied in response to selected signals applied to said second phase modulator first input, said first external optical fiber and said first and second phase modulators being part of a coiled optical fiber input means capable of having opposing electromagnetic waves, supplied from a common source means of electromagnetic waves, propagate commonly through each of said first external optical fiber and said first and second phase modulators in opposite directions, said common source means having a first control input at which provision of selected signals results in selected frequencies occurring in said electromagnetic waves provided thereby; and wherein said apparatus further comprises a second resonance determination signal generating means having an output electrically connected to said second phase modulator first input, said second resonance determination signal generator means being capable of providing an output signal containing a substantial signal component at a second resonance monitoring frequency; and yet further comprises a second signal component phase detection means having both a detection input, electrically connected to said second photodetector to receive said second photodetector output signal, and a demodulation input, electrically connected to said second resonance determination signal generating means output, and having an output electrically connected to said common source means first control input, said second signal component phase detection means being capable of using signals supplied at said demodulation input thereof, having a substantial demodulation signal component therein at a selected demodulation frequency, to cause signals to appear at said output thereof representing amplitudes of components of signals occurring at said detection input thereof based on said demodulation frequency.

23. The apparatus of claim 17 wherein said first signal component phase detection means further comprises an integrator electrically connected between said output thereof and said first resonance determination signal generating means amplitude control input.

24. The apparatus of claim 18 wherein said basic waveform consists of a relatively long duration of substantially monotonically changing magnitude in one magnitude direction followed by a much shorter duration of substantially monotonically changing magnitude in an opposite magnitude direction.

25. The apparatus of claim 18 in which said second photodetector also provides an output signal in response to impingement thereon of a corresponding said opposing coiled optical fiber electromagnetic wave which is representative of that wave, and further comprising a second phase modulator with said first external optical fiber being positioned with respect to said second phase modulator such that electromagnetic waves passing through at least a portion thereof also pass through said second phase modulator so as to be subject to having phases thereof varied in response to selected signals applied to said second phase modulator first input, said first external optical fiber and said first and second phase modulators being part of a coiled optical fiber input means capable of having opposing electromagnetic waves, supplied from a common source means of electromagnetic waves, propagate commonly through each of said first external optical fiber and said first and second phase modulators in opposite directions, said common source means having a control input at which provision of selected signals results in selected frequencies occurring in said electromagnetic waves provided thereby; and wherein said apparatus further comprises a second resonance determination signal generating means having an output electrically connected to said second phase modulator first input, said second resonance determination signal generator means being capable of providing an output signal containing a substantial signal component at a second resonance monitoring frequency; and yet further comprises a second signal component phase detection means having both a detection input, electrically connected to said second photodetector to receive said second photodetector output signal, and a demodulation input, electrically connected to said second resonance determination signal generating means output, and having an output electrically connected to said common source means first control input, said second signal component phase detection means being capable of using signals supplied at said demodulation input thereof, having a substantial demodulation signal component therein at a selected demodulation frequency, to cause signals to appear at said output thereof representing amplitudes of components of signals occurring at said detection input thereof based on said demodulation frequency.

26. The apparatus of claim 18 wherein said first signal component phase detection means further comprises an integrator electrically connected between said output thereof and said first resonance determination signal generating means amplitude control input.

27. The apparatus of claim 22 wherein said common source has a second control input to which an output of said amplitude modulation means is electrically connected.

28. The apparatus of claim 25 wherein said common source has a second control input to which an output of said amplitude modulation means is electrically connected.

29. A controller for reduction of optical Kerr effect error comprising:

a source for providing electromagnetic radiation at a source frequency;

a splitting means, connected to said source and having first and second ports, for providing first and second electromagnetic waves respectively, at first and second ports;

a sensing coil of optical fiber, having a resonance condition;

a coupler means, connected to said sensing coil, for coupling in first and second electromagnetic waves from the first and second ports of said splitting means to said sensing coil such that the first and second electromagnetic waves propagate in opposite directions within said sensing coil, and for coupling out a portion of the first and second electromagnetic waves;

first and second photodetectors, connected to said coupler means, for detecting and processing the portion of the first and second electromagnetic waves into first and second electrical signals, respectively;

a first phase detector, connected to said first photodetector, for providing a third signal for indicating the closeness of the frequency of the first electromagnetic wave to the resonance condition of said sensing coil;

a first modulator connected to said splitting means for phase modulating the first electromagnetic wave;

a second modulator connected to said splitting means for phase modulating the second electromagnetic wave;

a serrodyne generator, connected to said first phase detector and to said first modulator, for providing a repetitive signal having a variable frequency, for changing the frequency of the first electromagnetic wave to the resonance condition of said sensing coil, according to the third signal from said first phase detector;

a second phase detector, connected to said second photodetector and to said source, for providing a fourth signal for indicating the closeness of the frequency of the second electromagnetic wave to the resonance condition of said sensing coil, for adjusting said source so that the frequency of the second electromagnetic wave meets the resonance condition of said sensing coil;

first and second bias generators connected to said first and second modulators and to first and second phase detectors, respectively;

a third phase detector, connected to said first phase detector, for providing an error signal that indicates an optical Kerr effect error;

an amplitude modulation signal generator, connected to said third phase detector and to said source, for modulating the electromagnetic radiation from said source;

a voltage reference for reducing non-Kerr effect errors; and a summer, connected to said third phase detector and to said voltage reference, for providing a composite error signal to said first modulator for affecting a phase of the first electromagnetic wave and consequently an intensity of the first electromagnetic wave in said sensing coil to reduce optical Kerr effect and non-Kerr effect errors.

30. A fiber optic gyroscope comprising:

a light source for providing a first light;

a splitter, connected to said light source, for splitting the first light into a second light and a third light;

a first optical fiber loop having first and second ends for receiving the second light and the third light, respectively first and second phase modulators, situated on said first optical fiber loop, for modulating the second light and the third light, respectively;

a second optical fiber loop having a closed light path;

a first coupler for coupling the second light and the third light into said second optical fiber loop, the second light having a first direction of propagation in the closed light path of said second optical fiber loop and the third light having a second direction of propagation in the closed light path of said second optical fiber loop, wherein the first and second directions oppose each other;

a first detector, coupled to said second optical fiber loop, for detecting the second light in the closed light path of said second optical fiber loop;

a second detector, coupled to said second optical fiber loop, for detecting the third light in, the closed light path of said second optical fiber loop;

a first phase detector, connected to said first detector, for outputting a first amplitude signal indicating an amount of intensity of the second light signal;

a serrodyne generator, connected to said first phase detector and to said first phase modulator, for receiving the first amplitude signal to adjust a second frequency of the second light so as to maintain the second frequency at a resonance frequency in said second optical fiber loop;

a second phase detector, connected to said second detector, for outputting a second amplitude signal indicating an amount of intensity of the third light signal, the second amplitude signal going to said light source, to adjust a first frequency of the first light so as to maintain a third frequency of the third light at a resonance frequency in said second optical fiber loop;

a third phase detector, connected to said first phase detector, for receiving the first amplitude signal and outputting a Kerr error signal;

a voltage reference source for outputting a non-Kerr error signal;

a summer, connected to said third phase detector and to said voltage reference source, for combining the Kerr error signal and the non-Kerr error signal and outputting a composite error signal; and a generator, connected to said summer and to said first phase modulator, for receiving the composite error signal and outputting a compensating signal for adjusting a phase of the second light signal and consequently affecting the amount of intensity of the second light signal in said second optical fiber loop to reduce Kerr error and non-Kerr error in the fiber optic gyroscope.

* * * * *

UNITED STATES PATENT AND TRADEMARK OFFICE
CERTIFICATE OF CORRECTION

PATENT NO. : 5,465,149
DATED : November 7, 1995
INVENTOR(S) : L.J. Strandjord, G.A. Sanders It is certified that error appears in the above-indentified patent and that said Letters Patent is hereby corrected as shown below:

Column 36, line 16, delete "," after "in"

Signed and Sealed this

Twenty-third Day of April, 1996

Attest:

BRUCE LEHMAN

*Attesting Officer*     *Commissioner of Patents and Trademarks*